Inventor:
Silvio Barsanti,
By Soans, Pond & Anderson Attys.

April 18, 1950 S. BARSANTI 2,504,792

KNOTTING MECHANISM FOR SPIRAL-SPRING FORMING MACHINES

Filed Oct. 17, 1947 17 Sheets-Sheet 2

Inventor:
Silvio Barsanti,
By Evans, Pond & Anderson Attys.

April 18, 1950 S. BARSANTI 2,504,792

KNOTTING MECHANISM FOR SPIRAL-SPRING FORMING MACHINES

Filed Oct. 17, 1947 17 Sheets-Sheet 3

Inventor:
Silvio Barsanti,
By Soans, Pond & Anderson
Attys.

April 18, 1950 S. BARSANTI 2,504,792

KNOTTING MECHANISM FOR SPIRAL-SPRING FORMING MACHINES

Filed Oct. 17, 1947 17 Sheets-Sheet 4

Inventor:
Silvio Barsanti,
By Soans, Pond & Anderson Attys.

April 18, 1950 S. BARSANTI 2,504,792

KNOTTING MECHANISM FOR SPIRAL-SPRING FORMING MACHINES

Filed Oct. 17, 1947 17 Sheets-Sheet 5

Inventor:
Silvio Barsanti,
By Soans, Pond & Anderson
Attys

Inventor:
Silvio Barsanti,
By Soans, Pond & Anderson
Attys.

Inventor:
Silvio Barsanti,
By Soans, Pond & Anderson
Attys.

April 18, 1950 S. BARSANTI 2,504,792

KNOTTING MECHANISM FOR SPIRAL-SPRING FORMING MACHINES

Filed Oct. 17, 1947 17 Sheets-Sheet 8

Inventor:
Silvio Barsanti,
By Soans, Pond & Anderson
Attys.

Inventor:
Silvio Barsanti,
By Hoare, Pond & Anderson
Attys.

Inventor:
Silvio Barsanti,
By Soans, Pond & Anderson
Attys.

Inventor:
Silvio Barsanti,
By Soans, Pond & Anderson Attys.

April 18, 1950 S. BARSANTI 2,504,792

KNOTTING MECHANISM FOR SPIRAL-SPRING FORMING MACHINES

Filed Oct. 17, 1947 17 Sheets-Sheet 12

Inventor:
Silvio Barsanti,
By Soans, Pond & Anderson
Attys.

April 18, 1950

S. BARSANTI

KNOTTING MECHANISM FOR SPIRAL-SPRING FORMING MACHINES 2,504,792

Filed Oct. 17, 1947

17 Sheets-Sheet 13

Inventor:
Silvio Barsanti,
By Doane, Pond & Anderson
Attys

April 18, 1950

S. BARSANTI 2,504,792

KNOTTING MECHANISM FOR SPIRAL-SPRING FORMING MACHINES

Filed Oct. 17, 1947

17 Sheets-Sheet 14

Inventor:
Silvio Barsanti,
By Soans, Pond & Anderson Attys.

Inventor:
Silvio Barsanti,
By Soans, Pond & Anderson
Attys.

April 18, 1950

S. BARSANTI

KNOTTING MECHANISM FOR SPIRAL-SPRING FORMING MACHINES 2,504,792

Filed Oct. 17, 1947

17 Sheets-Sheet 16

Inventor:
Silvio Barsanti,
By Soans, Pond & Anderson
Attys.

April 18, 1950 S. BARSANTI 2,504,792

KNOTTING MECHANISM FOR SPIRAL-SPRING FORMING MACHINES

Filed Oct. 17, 1947 17 Sheets-Sheet 17

Inventor:
Silvio Barsanti,
By Soans, Pond & Anderson Attys.

Patented Apr. 18, 1950 2,504,792

UNITED STATES PATENT OFFICE 2,504,792

KNOTTING MECHANISM FOR SPIRAL-SPRING FORMING MACHINES

Silvio Barsanti, San Francisco, Calif., assignor to Simmons Company, Kenosha, Wis., a corporation of Delaware Application October 17, 1947, Serial No. 780,502

5 Claims. (Cl. 140—101)

This invention relates to a machine for making spiral springs and more particularly that part of the machine which knots or ties the ends of the spring. Essentially the invention is an improvement on the machine disclosed in Patent No. 1,851,540, issued March 29, 1932, to John J. Gail.

In the formation of spiral springs for upholstered or sleeping furniture, wire of a suitable size is run through a forming die and issues therefrom in spiral form. Subsequently the two free ends have to be twisted around the respectively adjacent convolutions of the coil to form a knot. In the machine shown and described in the aforesaid patent the twisting of these free spring ends is effected in succession for each spring. However, the second knot on one spring is being effected simultaneously with the twisting of the first knot on a subsequently-formed spring. Generally it is of no moment that the twisted ends or knots on one spring are not in alinement axially of the finished spring. However, for use in certain types of automatically-operated machine used for assembling a plurality of these coil springs into a bed spring, it is important that these twisted ends be in approximate alinement axially of the respective spring.

The main objects of this invention, therefore, are to provide improved means, for a machine of the type disclosed in the aforesaid United States patent, for adjusting the spiral spring in the second knot-tying position so that the knots formed at the opposite ends of the spring are very nearly if not exactly in alinement axially of the spring; to provide an improved form and mounting of the centering head of the second knotting device for machines of this kind; to provide an improved means for actuating said centering head whereby the spring with the first knot formed therein is rotatably adjusted so as to dispose the second knot very nearly if not exactly in alinement with the opposed mechanism by means of which the second knot is formed.

Figure 1:
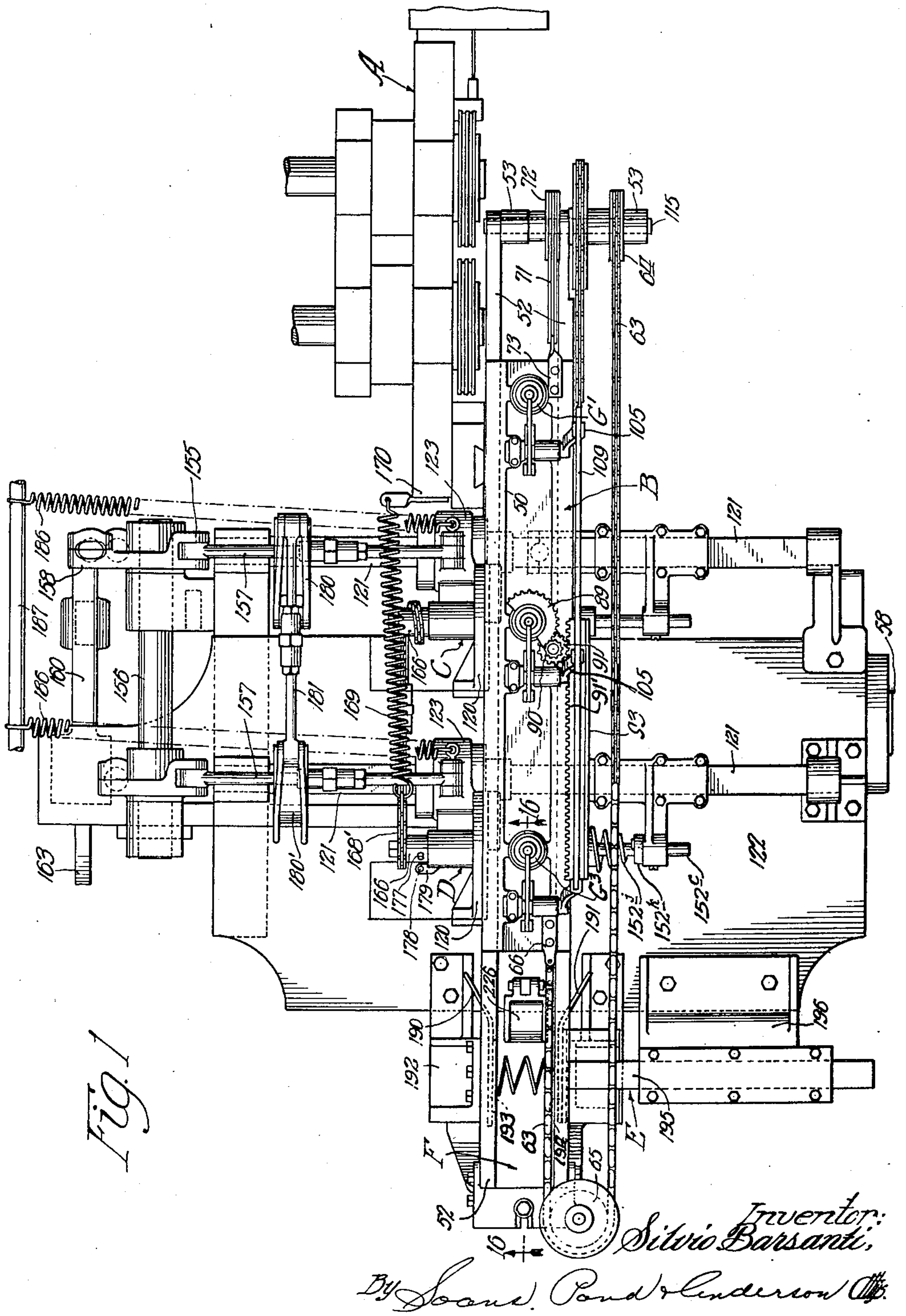
Fig. 1 is a plan view of a spiral-spring knotting-machine embodying this invention.
Figure 2:
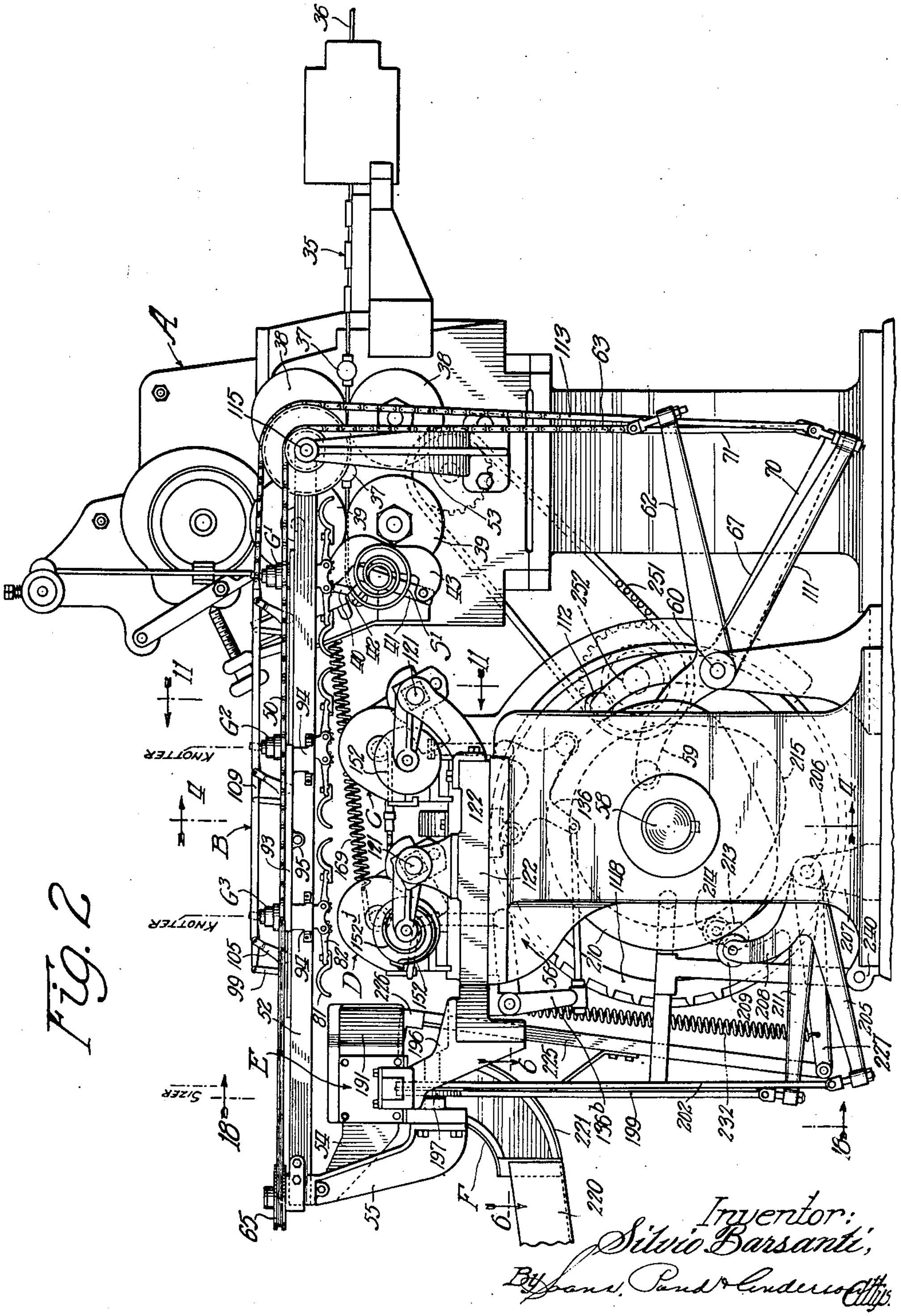
Fig. 2 is a side elevation of the same.
Figure 4:
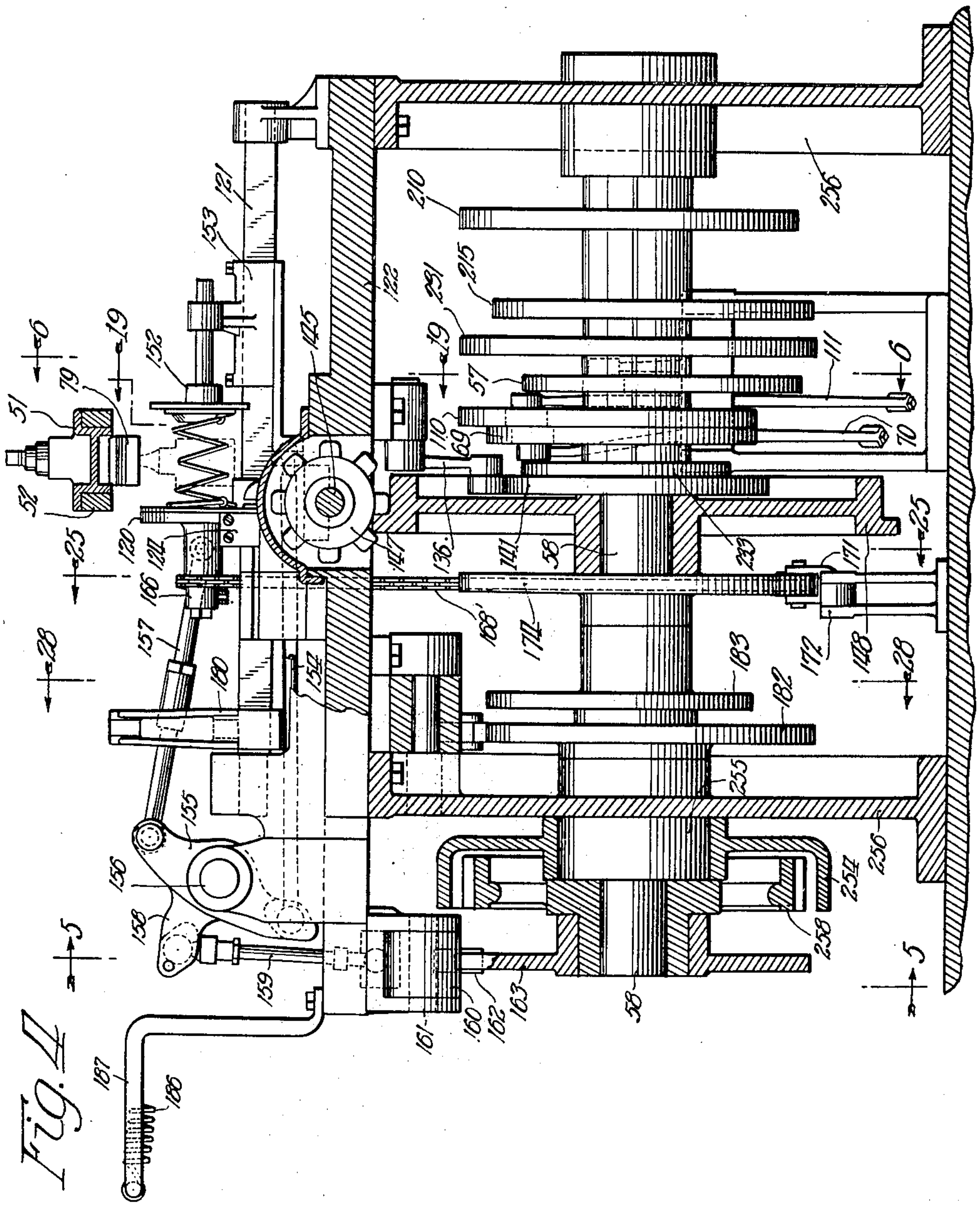
Fig. 4 is a sectional elevation taken on the plane of the line 4—4 of Fig. 2.
Figure 10:
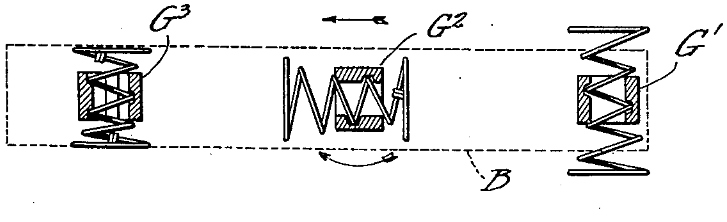
Figures 11, 12:
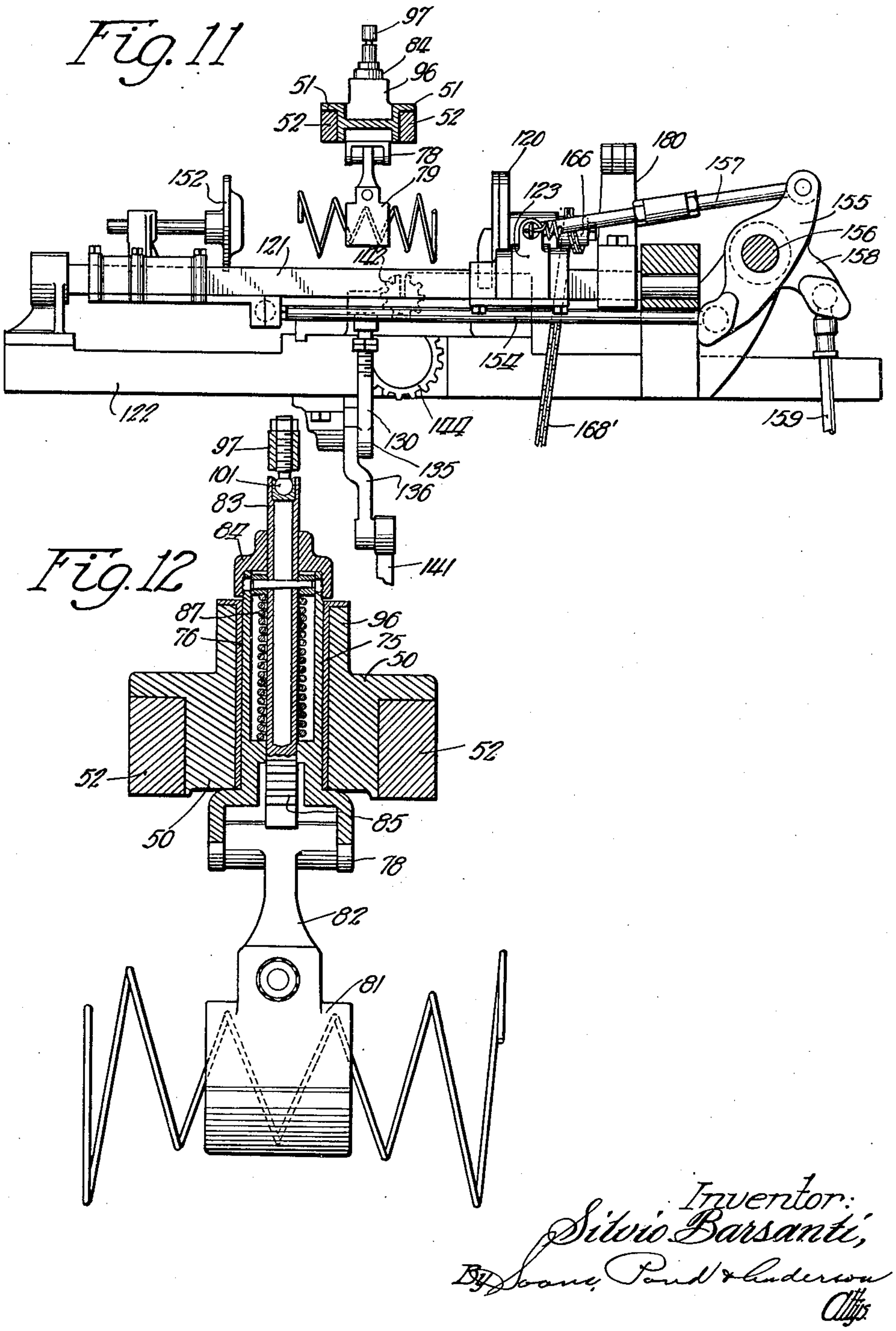
Figures 13, 14:
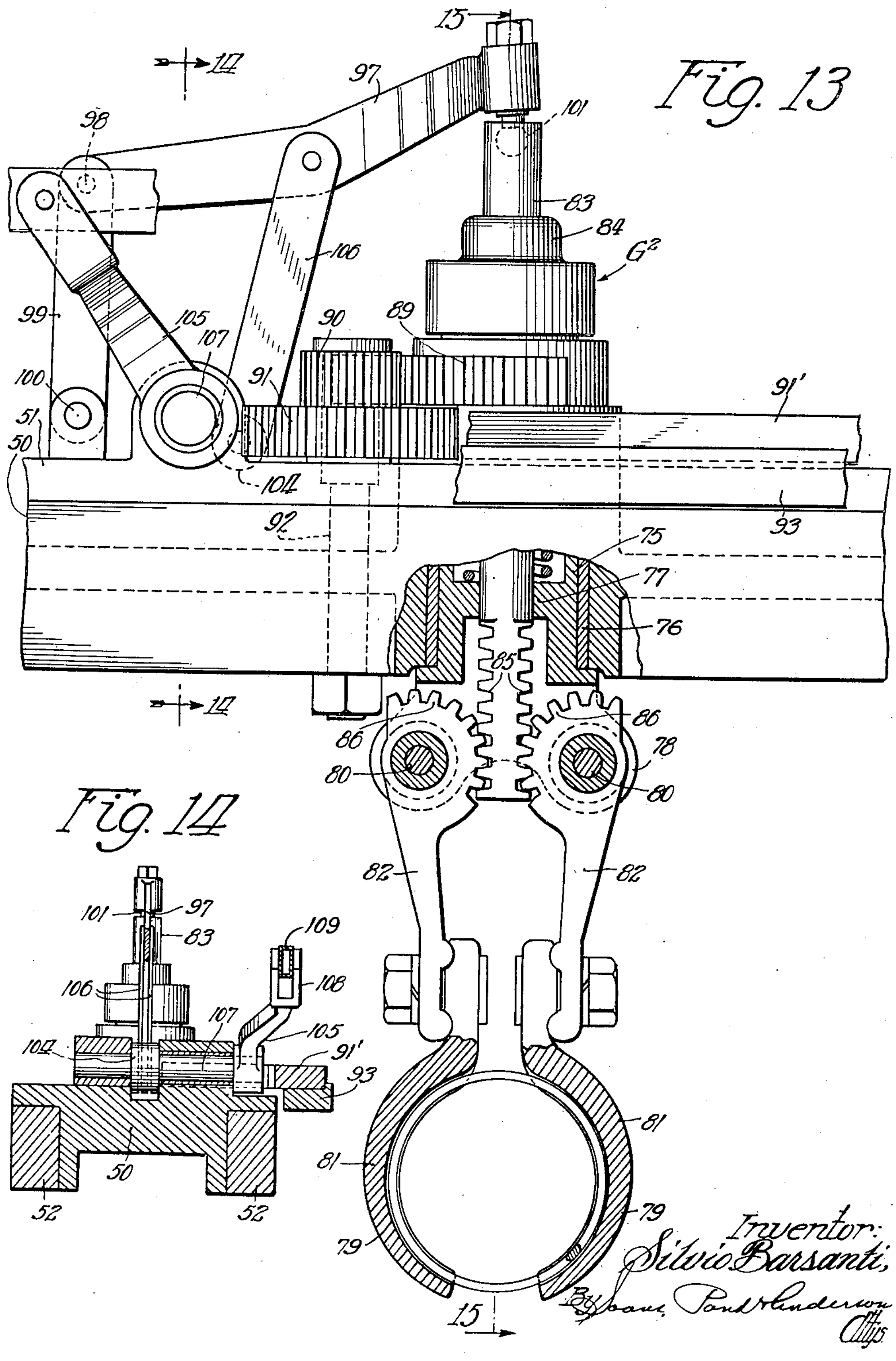
Figure 15:
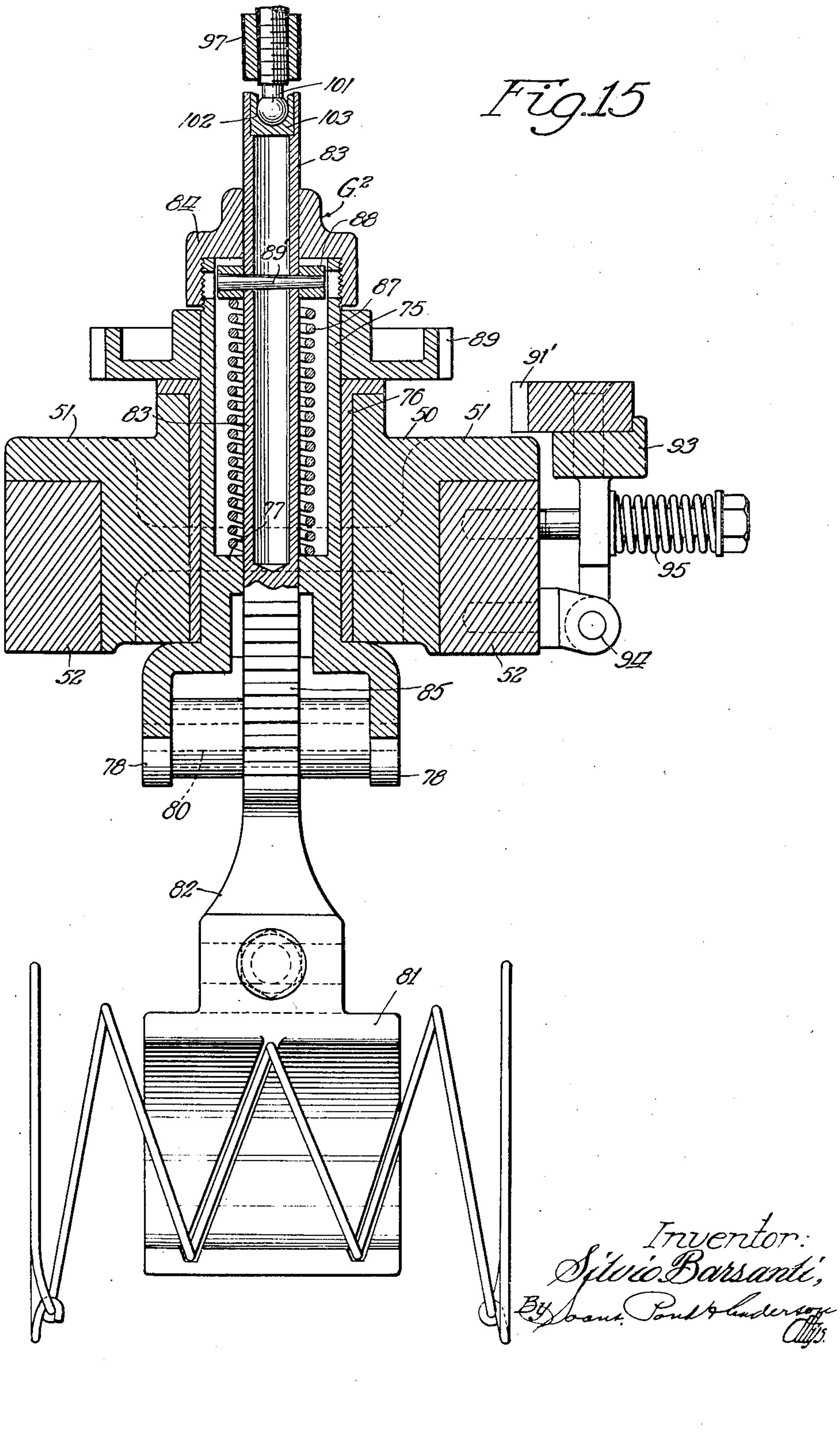
Figures 16, 17:
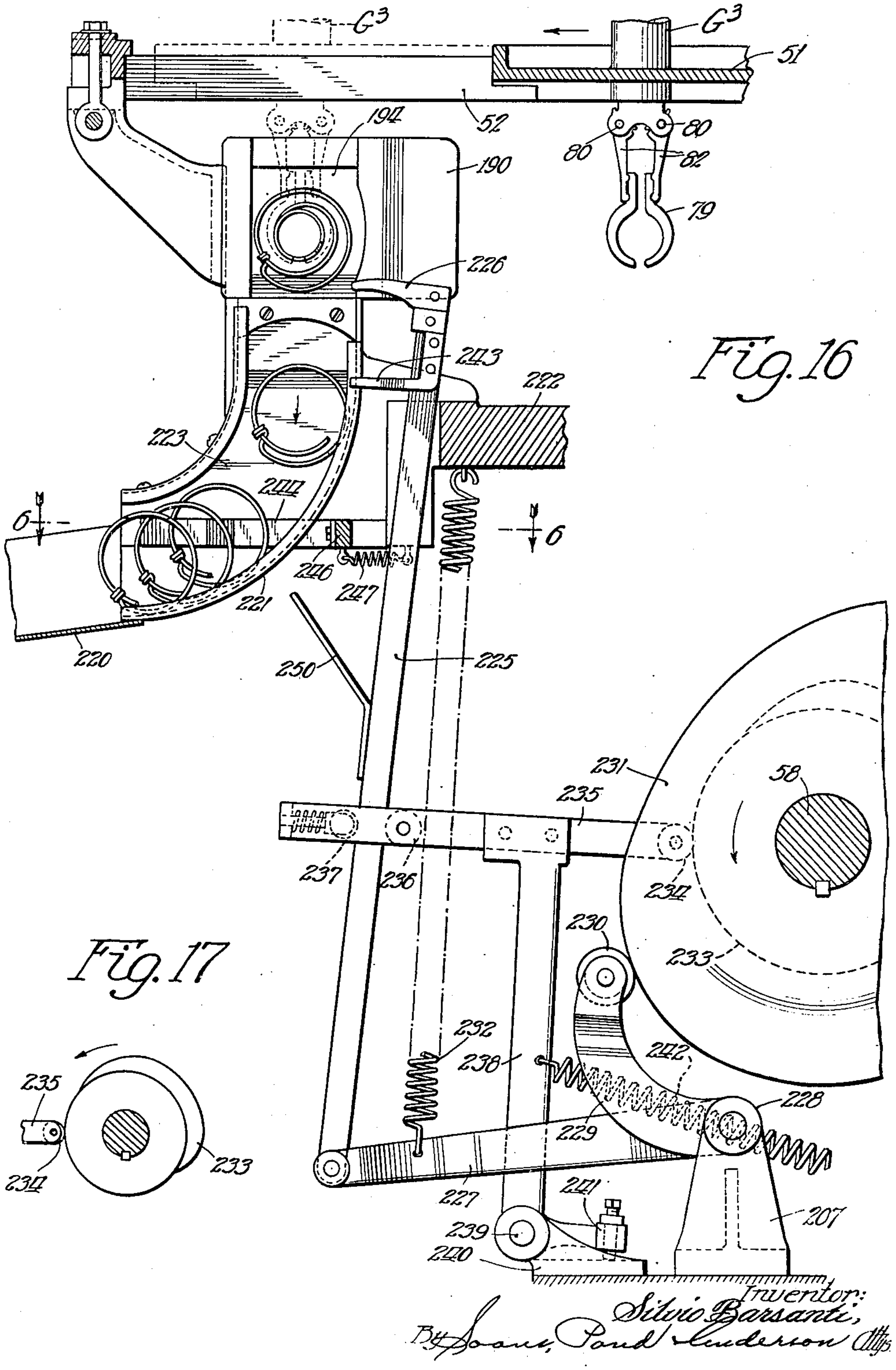
Figure 18:
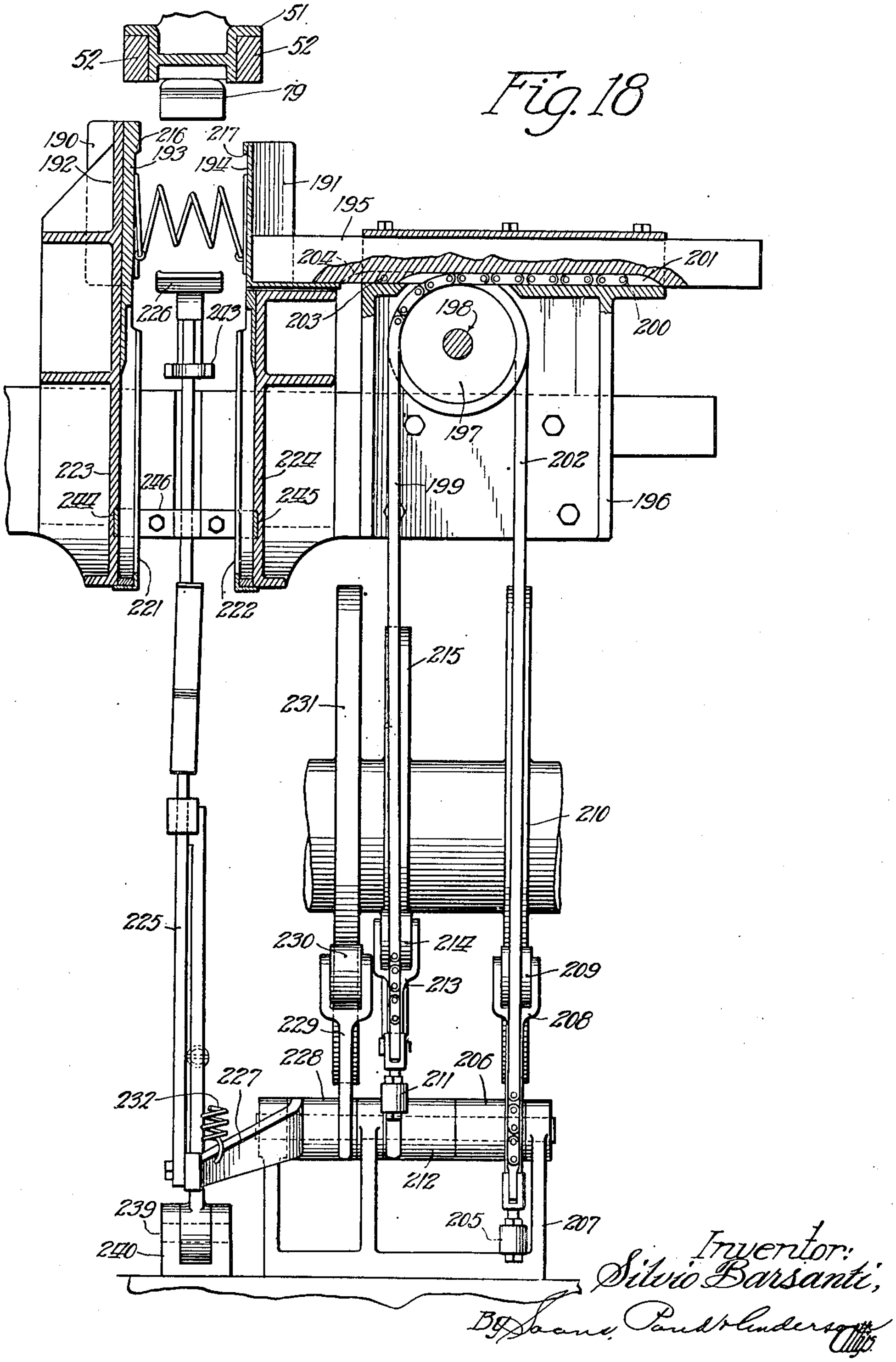
Figures 19, 20:
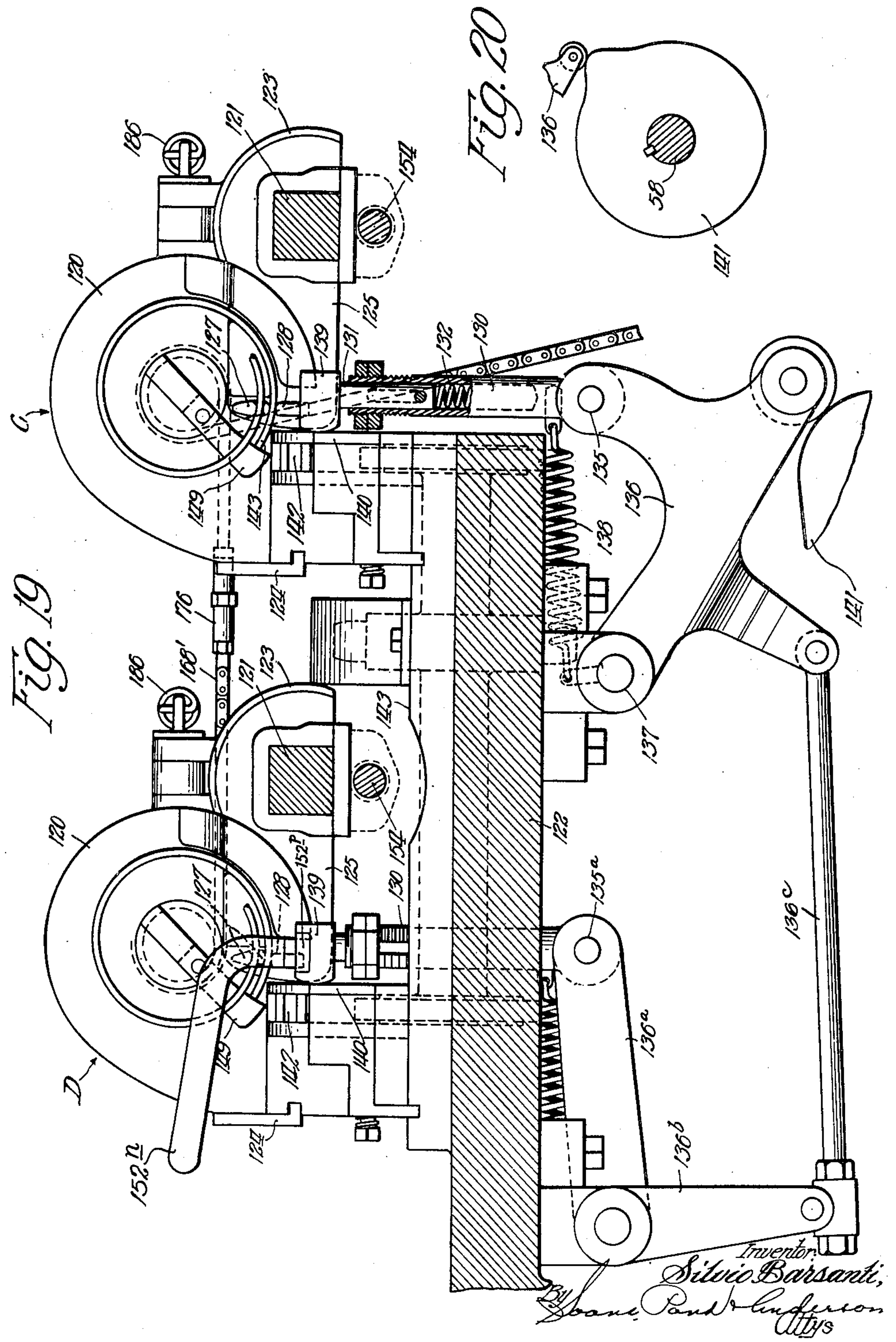
Figures 21, 22, 23, 24:
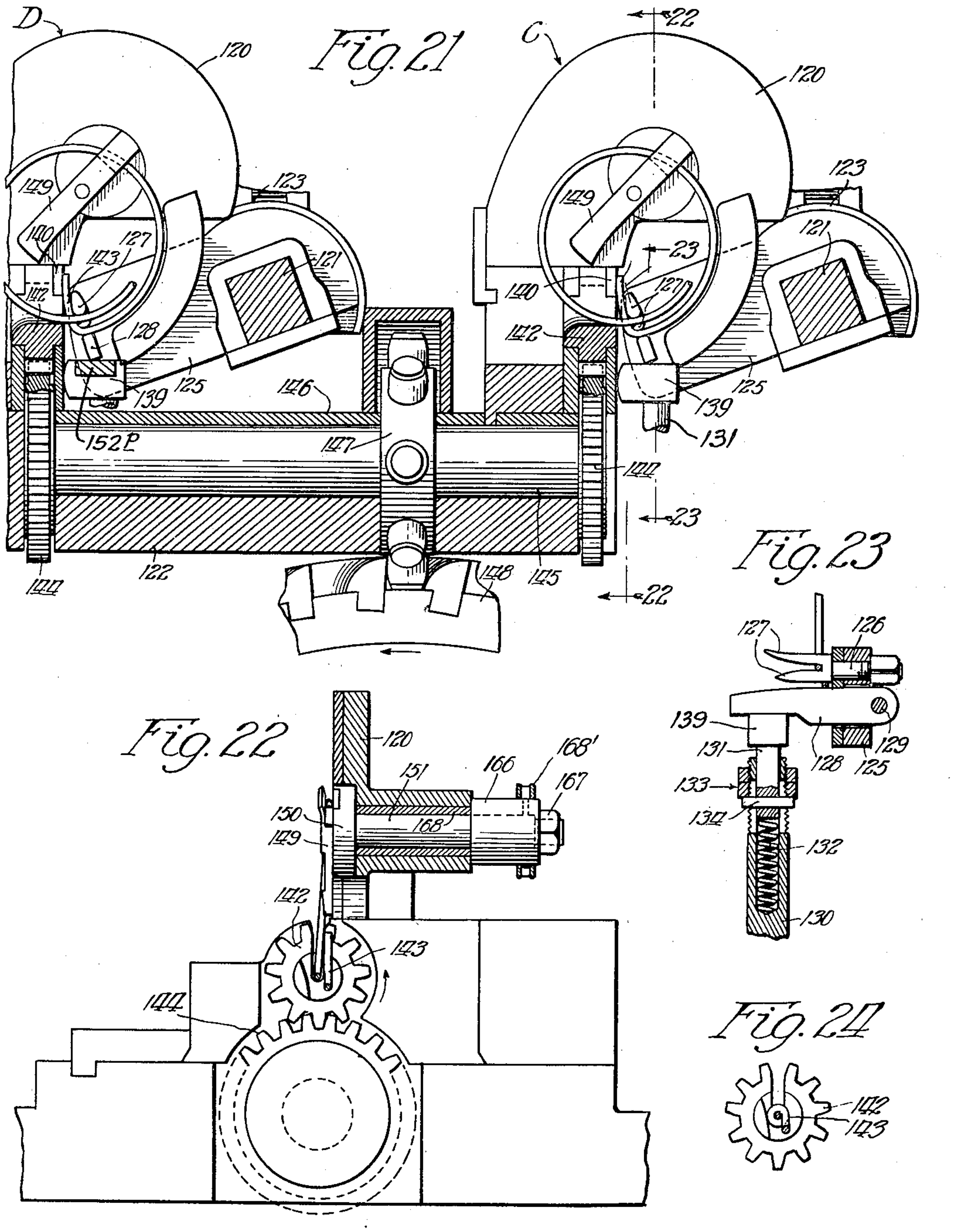
Figures 25, 26, 27:
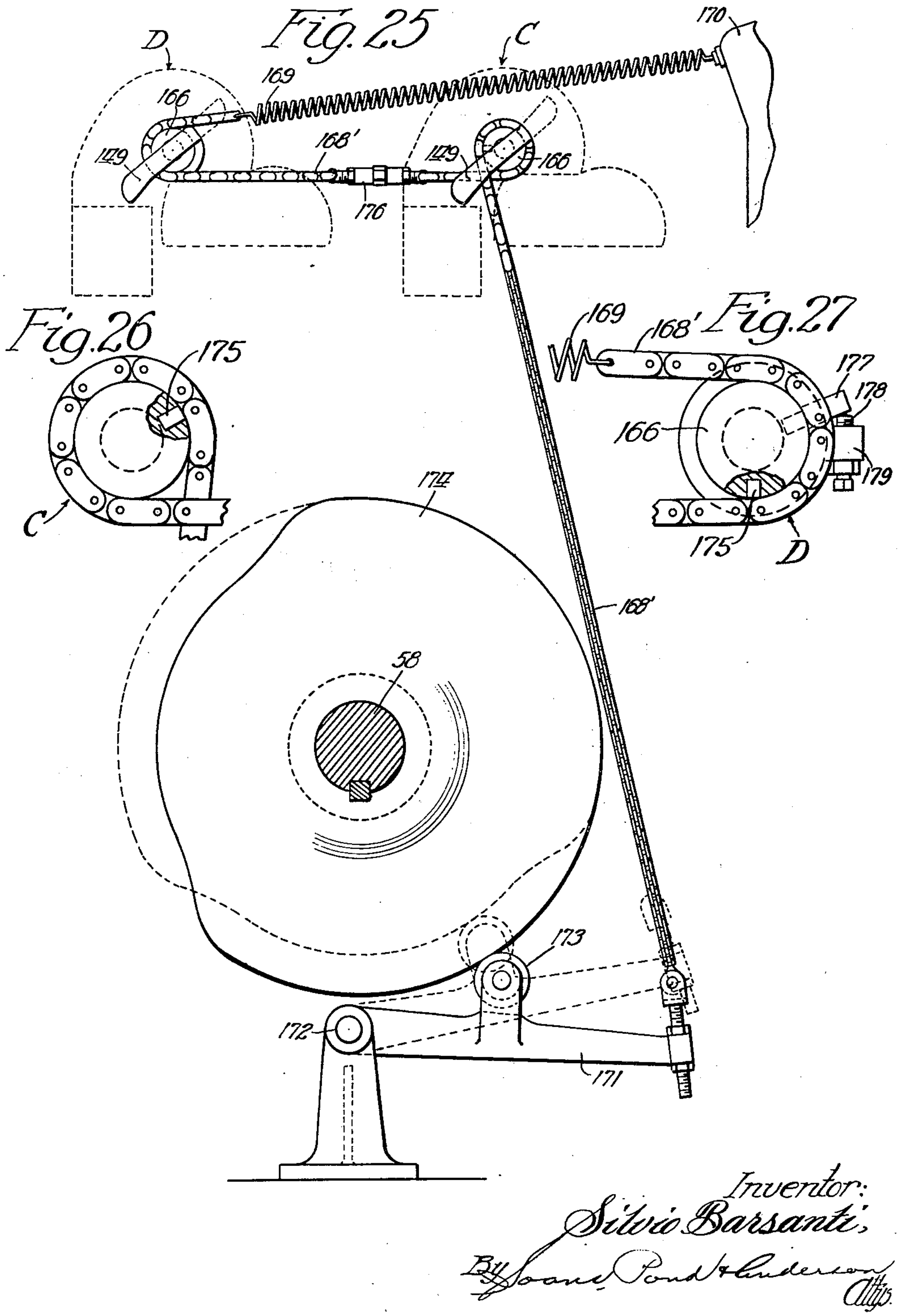
Figure 28:
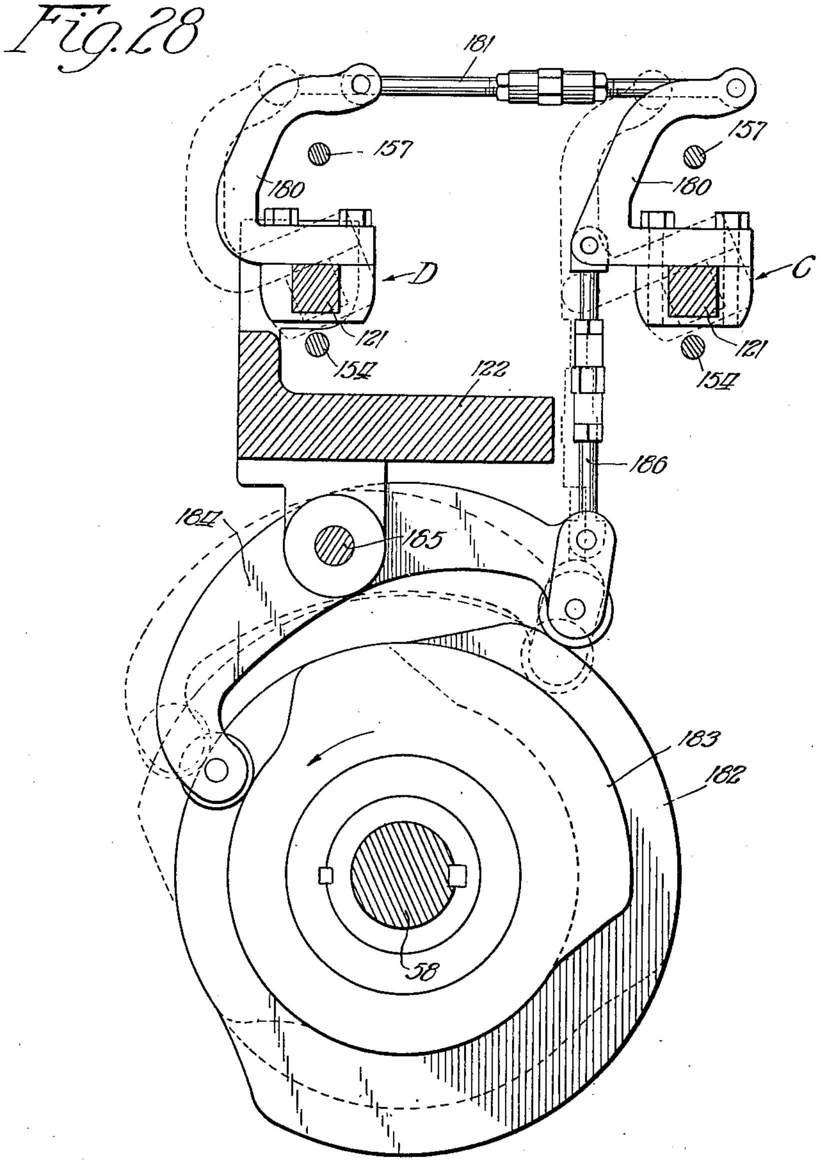
Figure 29:
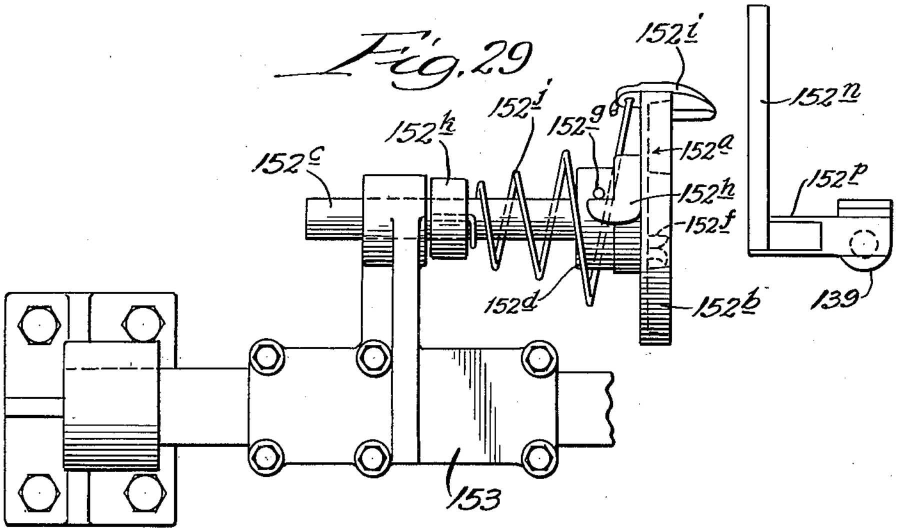
Figures 30, 31:
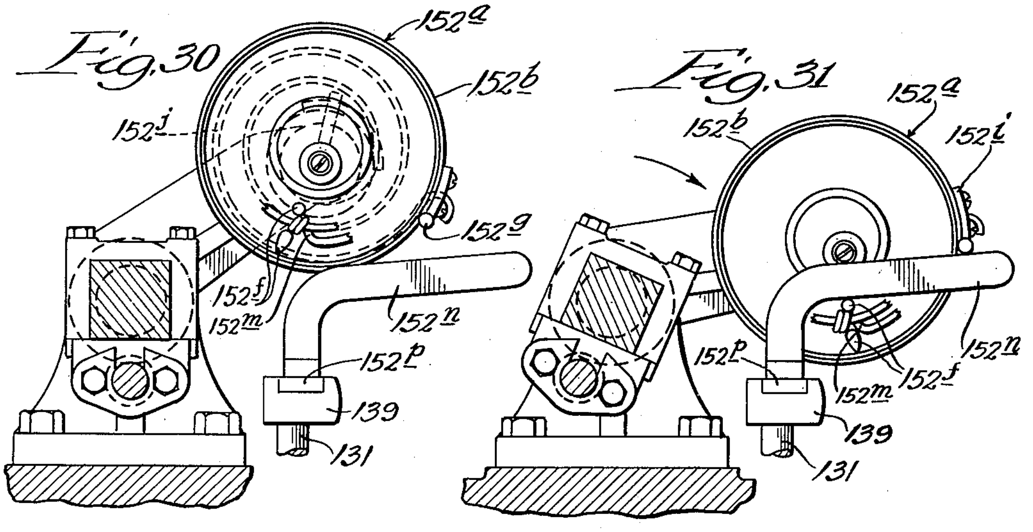

Fig. 10 diagrammatically illustrates one stage in the course of travel of a spring through the machine;

Fig. 11 is a fragmentary end elevation taken on the plane of the line 11—11 of Fig. 2;

Fig. 12 is an enlarged vertical sectional view through one of the devices by means of which the springs are conveyed from one of the operating devices to another;

Fig. 13 is an enlarged elevation of one of these spring conveying means, certain parts being broken away and shown in section to more clearly indicate the construction thereof;

Fig. 14 is a sectional detail taken on the line 14—14 of Fig. 13;

Fig. 15 is a sectional elevation, taken on the line 15—15, of the construction shown in Fig. 13;

Fig. 16 is an enlarged sectional elevation of the spring nesting-receiving mechanism as viewed from the plane of the line 16—16 of Fig. 1;

Fig. 17 is a reduced detail view illustrative of one of the operating cams shown in Fig. 16;

Fig. 18 is a sectional end elevation taken on the line 18—18 of Fig. 2;

Fig. 19 is an enlarged sectional elevation of the knotting devices taken on the line 19—19 of Fig. 4;

Fig. 20 is a reduced detail illustrative of one of the operating cams shown in Fig. 19;

Fig. 21 is a view similar to Fig. 19 but showing certain parts in position preparatory to forming the knots;

Figs. 22 and 23 are sections on the lines 22—22 and 23—23 respectively of Fig. 21;

Fig. 24 is an illustration of the knotting gear shown in Fig. 22 after the knot has been formed;

Fig. 25 is a sectional elevation taken on the line 25—25 of Fig. 4, certain parts being omitted to clarify the illustration;

Figs. 26 and 27 are reversed views of the parts shown in the upper portion of Fig. 25 taken inwardly of the parts shown in dotted outline;

Fig. 28 is an enlarged sectional elevational view taken on the line 28—28 of Fig. 4;

Fig. 29 is an enlarged plan view of the improved spring-centering head for the second knotter;

Fig. 30 is an end elevation of the spring-centering head as viewed from the right-hand side of Fig. 29, the parts being shown in the position occupied prior to their engagement of a coil spring preparatory to its being shifted into knotting position; and Fig. 31 is a view similar to Fig. 30 but showing the parts shifted angularly for the purpose of bringing the end of the coil spring into position for knotting.

Figure 32:
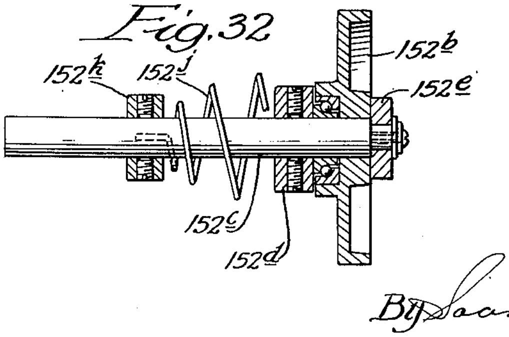

Fig. 32 is a sectional view of the improved spring-centering head as shown in Fig. 29.

GENERAL DESCRIPTION

With particular reference to Figs. 1 and 2, a machine embodying this invention includes a coil-forming mechanism A, a coil-spring conveying mechanism B, first and second knotters C and D, and coil-spring sizing mechanism E. The coil springs formed by the coiling mechanism A are transported by the conveyor mechanism B (Fig. 2) to the other mechanisms. The knotting mechanism in the present instance includes a pair of knotting devices indicated at C and D respectively, these devices being respectively operable to tie or knot the opposite free ends of the springs formed by the coiling mechanism. Upon completion of the second knotting operation, the springs are conveyed from the second knotter D to a sizing mechanism E which is located at the entrance to a spring receptacle F in which the completed and sized springs are nested so that large quantities of the springs occupy a minimum of space and may be conveniently handled and stored for future use.

*The coil-forming mechanism*

The coil-forming mechanism A is preferably of the type disclosed in United States Patent 1,681,728, issued August 21, 1928, to John F. Gail. Briefly described, such a wire-coiling mechanism includes wire-straightening rolls or the like indicated at 35 through which spring wire 36 passes to be straightened. The wire 36 is guided by suitable guides 37 through cooperating upper and lower feed roll pairs 38 and 39 respectively which are actuated to intermittently advance the wire to form the springs. The wire is directed against a coiling block 40 which bends the wire into coil form. A pitch block 41 is provided for controlling the spacing or pitch of the coils. A cut-off device 42 is provided for severing the completed spiral spring from the wire supply during the intervals in which the feed rolls 38 and 39 are made inoperative to advance the wire.

The coiling mechanism thus far described is in all material respects the same as that shown in the aforesaid Patent No. 1,681,728, and the operating mechanism may also be the same. Hence, further detailed description of the coiling mechanism is deemed unnecessary in this description. However, there has been added to the coiling mechanism of said patent, a shield indicated at 43 for preventing accidental entanglement of the last formed portion of each coil spring with the adjacent mechanism of the coiling machine or with the adjacent portion of the wire stock which is being directed against the coiler block. This shield 43 may conveniently be mounted on the pitch block 41 as clearly shown in Fig. 2.

Figure 3:
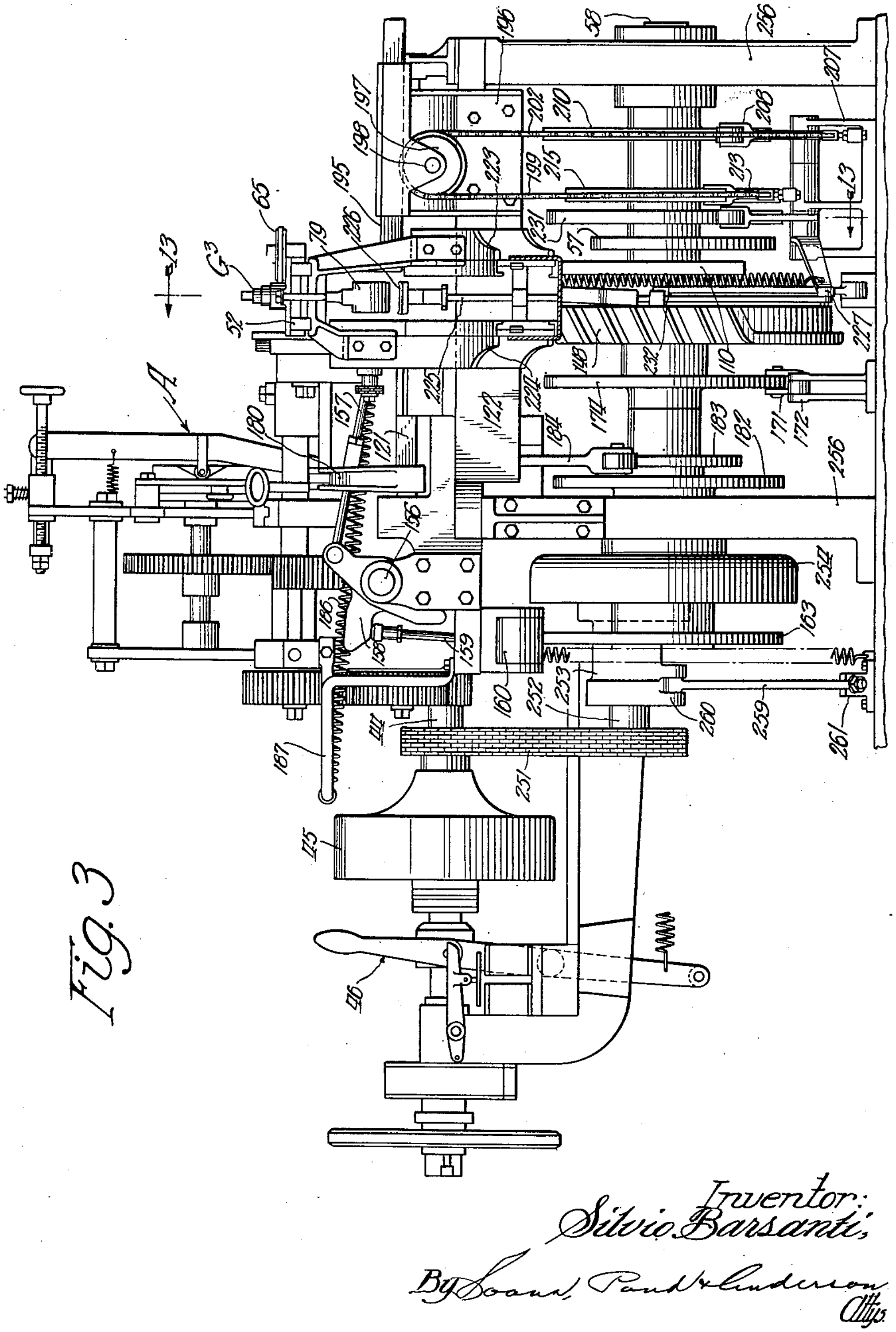
Fig. 3 is an end elevation of the left hand end of the machine shown in Figs. 1 and 2.

The coiling mechanism may be driven from a main power shaft 44 to which power is transmitted by a belt driven pulley 45 and suitable clutch mechanism indicated at 46 (see Fig. 3).

A coil spring formed by the coil mechanism A is indicated at $S^1$ (Fig. 2). This reference character also denotes the first position of a spring in the machine wherein is incorporated the invention later to be described.

*The conveying mechanism*

The conveying mechanism B includes an elongated carriage or rider 50 which in cross-section is more or less I-shaped as clearly indicated in Fig. 15 and is provided with outwardly extending flanges 51—51 on its opposite sides whereby the carriage is slidably mounted on a pair of supporting rails or bars 52—52. The supporting rails 52—52 are mounted at one end on bracket 53 which is supported by the frame of the coiling mechanism A (see Fig. 2). The opposite ends of the rails 52—52 are supported by means of brackets such as indicated at 54 and 55, the latter being mounted on conveniently accessible stationary parts of the main framework of the knotting and sizing mechanism. The said main framework is designated by the reference character 56 (see Fig. 2). The carriage 50 is slidable longitudinally along the rails 52—52 and cam-actuated means is provided for effecting reciprocation of the carriage along the said rails.

Figure 7:
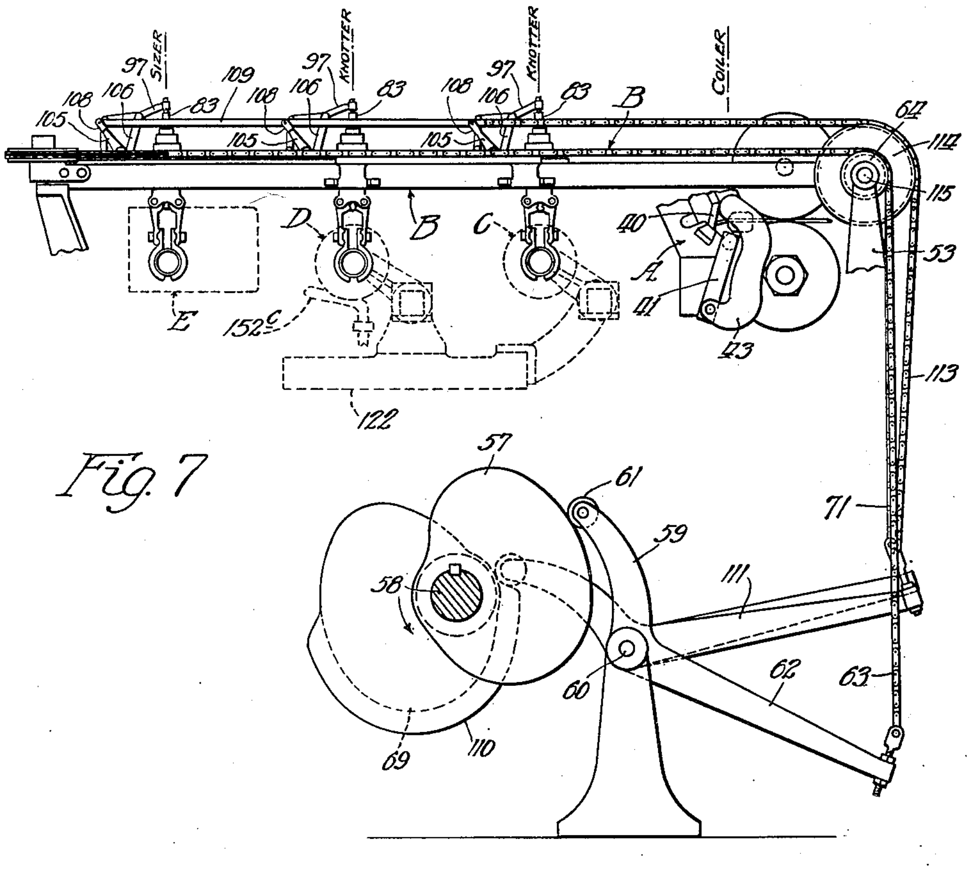
Fig. 7 is a more or less diagrammatic side elevation of the coordinated relationship of the spring forming and knotting mechanisms and the conveying mechanism whereby the springs are moved to and through the successive operations.

As best shown in Figs. 3 and 4, this actuating means includes a cam 57 which is keyed to a main power shaft 58. The main power shaft 58 extends transversely of the knotting mechanism and is mounted in suitable bearings provided in the supporting framework of the machine. The cam 57 acts on the free end of a bell crank arm 59 (see Figs. 2 and 7) to rock the bell crank about its pivot 60, the said free end of the arm being provided with an anti-friction roller 61. The other arm of the bell crank is indicated at 62 and has its free end connected by means of a chain 63 to the left hand end of the carriage 50. The chain 63 is adjustably connected to the free end of the bell crank arm 62 by any suitable means such as indicated in Fig. 7 and it extends upwardly to a roller 64 over which it passes as clearly shown in Figs. 2 and 7. At the left-hand end of the machine, the chain 63 passes around a roller 65, as clearly shown in Fig. 1. The adjacent end of the chain is connected to the left-hand end of the carriage by means of an attaching bracket 66 or the like. When the carriage 50 is in its right-hand position as shown in Figs. 1 and 2, the bell crank arm 62 is in an up-position, as shown in Fig. 2. The cam 57 is then operative to effect downward movement of the arm 62 and consequent movement of the carriage towards the left-hand end of the mechanism.

Figure 8:
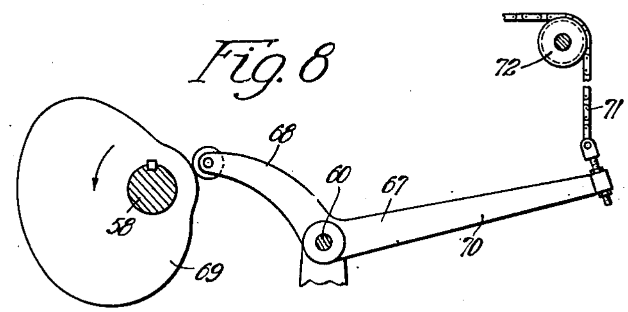
Fig. 8 is a detail illustrative of a part of the mechanism shown in Fig. 7.

Similar mechanism is provided for moving the carriage towards the right. This mechanism includes a bell crank 67 which is pivotally mounted on the pivot rod 60. One arm 68 (see Fig. 8) of the bell crank 67 is adapted to be actuated by a cam 69 and the other arm 70 of the bell crank is connected by means of a chain 71 to the right-hand end of the carriage. The chain 71 extends upwardly from the outer end of the bell crank arm 70 and over a pulley 72 (see Fig. 1) and is connected to the right-hand end of the carriage by means of a connecting bracket or the like indicated at 73. When the carriage is in its left-hand position as represented in Fig. 7, the bell crank 67 is substantially in the position as indicated in Figs. 7 and 8 and the cam 69 is then operative to swing the bell crank so as to cause the outer end of the arm 70 thereof to move downwardly, thereby pulling the carriage to the right. The cams 57 and 69 are arranged, of course, in properly synchronized relation to effect reciprocation of the carriage in proper relation to the operation of the spring coiling, knotting, and sizing devices.

Figure 9:
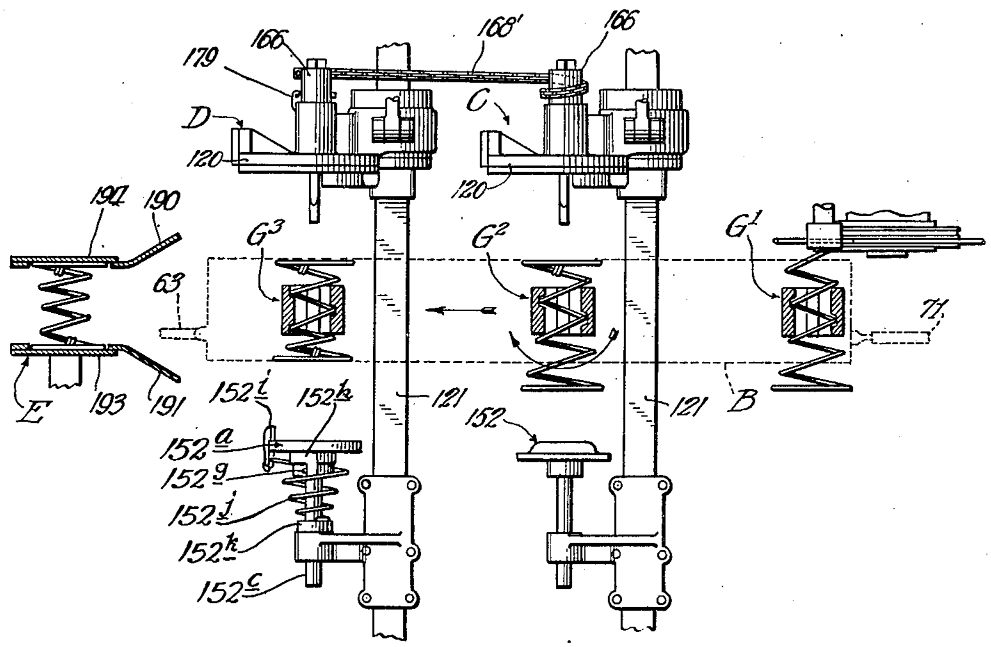
Fig. 9 is a plan view of the diagrammatic arrangement shown in Fig. 7.

The carriage 50 is provided with three spring gripping units in this instance, one of which is indicated at $G^1$, a second at $G^2$, and a third at $G^3$ (see Figs. 2, 9, and 10). The gripper $G^1$ serves to convey springs from the coil mechanism to the first knotter C, the gripper $G^2$ for conveying springs from the first knotter C to the second knotter D, and the gripper $G^3$ for conveying springs from the second knotter D to the sizing mechanism E. The respective gripping devices are substantially the same construction except that the second gripper $G^2$ is arranged to rotate 180 degrees during its travel from the first knotter to the second knotter so as to reverse the spring carried thereby, whereby the end left unknotted by the knotter C is presented to the knotter D, it being observed that both knotters are arranged in line on the same side of the path of travel of the spring.

*The spring grippers*

Describing first the gripper $G^2$, reference is directed particularly to Figs. 1, 13, 14, and 15. It will be seen that the gripper $G^2$ includes a sleeve-like member 75 which extends through and is rotatably mounted in the carriage 50, a suitable apertured boss being provided therein for receiving the sleeve. A bushing 76 may be provided for eliminating wear and insuring smooth operation of the mechanism. The sleeve 75 is provided with an internal or inwardly-extending flange 77 adjacent its lower end, and the lower end of the sleeve outwardly of the carriage 50 is bifurcated so as to form ears 78—78. As seen in Fig. 13, the ears 78—78 serve to pivotally receive a pair of spring-gripping jaws 79—79, these jaws being pivotally mounted between the opposite ears by means of pivot pins 80—80 whereby the jaws are adapted to be pivotally moved towards and away from each other.

The jaws 79—79 may be of one-piece construction. However, a two-piece structure is preferred, which includes arcuate jaw parts proper 81—81 and arm parts 82—82. The latter are pivoted between the opposite ears 78—78 and have the arcuate jaws 81 removably secured thereto, for instance, by means of bolts as clearly shown in Fig. 13. Replacement of the arcuate jaws 81—81 in the event of breakage, wear or other difficulties, including change in spring size to be handled, is readily accomplished.

For effecting pivotal movement of jaws as above explained, an actuating member 83, in the form of a rod, is slidably mounted in a bearing opening provided in the flange 77 adjacent the lower end of the sleeve 75. The upper end of the actuating member 83 is slidably mounted in a suitable bearing opening provided in a cap member 84. This cap member is mounted on the upper end of the sleeve by means of screw thread as clearly shown in Fig. 15. The lower end of the actuating member 83 is provided with oppositely facing sets of gear teeth as indicated at 85—85 which constitute racks adapted to engage with gear segments 86—86 formed integral with the jaw arms 82—82. It will be seen that by reciprocation of the actuating member 83, the jaws will be caused to close and open. A spring 87 is disposed around the actuating member 83 inside of the sleeve 75 and intermediate the internal flange 77 and a collar 88 which is secured to the actuating member by suitable means such as a taper pin 89'. In order to permit insertion and removal of the taper pin 89', the sleeve 75 may be provided with oppositely disposed openings as clearly shown in Fig. 15. The spring 87 normally tends to move the actuating member 83 upwardly and thereby to swing the gripping jaws into closed position as shown in Figs. 13 and 15. Means for moving the actuating member 83 downwardly to open the jaws will be described subsequently.

The rotating of the gripper $G^2$, during its travel from the knotter C to the knotter D, is effected by gear mechanism which includes a gear segment 89 keyed or otherwise non-rotatably mounted on the sleeve 75 (see Figs. 13 and 15). The gear segment 89 meshes with a pinion 90 which is carried by a gear 91, the latter being rotatably mounted on the carriage 50 by means of a shaft bolt 92. The gear 91 is arranged to mesh with a rack 91' which is mounted on one of the side rails 52. The rack 91' is mounted so as to be longitudinally fixed with respect to the travel of the carriage 50 but so as to be displaceable transversely of the carriage. The means for so mounting the rack 91' includes a mounting bracket 93 which is pivotally mounted adjacent its ends as shown at 94—94 (see Fig. 15) on the side rail 52. Intermediate its ends, a spring device 95 is provided for normally urging the bracket 93 and rack 91' to move inwardly of the carriage 50 into mesh with the gear 91. Under normal conditions, the gear 91 and the rack 91' remain in mesh and hence inward movement of the rack under the influence of the spring 95 is limited. In the event that sufficient resistance is offered to prevent rotation of the gripper $G^2$, the spring 95 will permit the rack 91' to be forced outwardly out of mesh with the gear 91, thereby preventing possible breakage or other damage to certain parts of the mechanism.

The grippers $G^1$ and $G^3$ may be of substantially the same construction as above described in connection with the gripper $G^2$, but inasmuch as these grippers need not be rotated, the gear mechanism for effecting such rotation is eliminated, thereby somewhat simplifying the structure. The arrangement of the non-rotatable grippers is clearly shown in Fig. 12. The carriage 50 is provided with an elongated boss 96 to occupy the space taken up by the gear 89 in the rotatable gripper construction. Any suitable means may be used for preventing rotary displacement of the grippers $G^1$ and $G^3$, for instance by making the sleeve part 75 a tight fit in the bushing 76, by providing key means (not shown), or by causing the cap part 84 to act as a clamping nut against the top of the bushing 76 so as to draw the enlarged, bifurcated end of the sleeve into tight engagement with the bottom of the carriage 50.

*The gripper jaw opening and closing mechanism*

The mechanism for effecting operation of the actuating member 83 and gripper jaws 79—79 includes a rock lever 97 (see Figs. 7, 11–15) which is pivotally mounted at one end as indicated at 98 to the free end of a link 99, the other end of which is pivotally mounted as indicated at 100 on the carriage 50. The free end of the rock lever 97 is provided with a ball-headed stud 101 which is adjustably mounted in the enlarged end portion of the rock lever 97, as clearly shown in Figs. 13 and 15. The ball end of the stud 101 engages a socket 102 provided in the upper end of the actuating member 83, the said socket being formed, in this instance, in a suitable hard metal block 103 which is recessed into the actuating member 83 and seated on shoulders provided in the latter, as clearly shown in Fig. 15.

The rock lever 97 is connected to the end 104 of a lever 105 by means of a link 106 which is pivotally connected to the said lever end 104 at one end and at its other end to the rock lever 97 intermediate the ends of the latter. The lever 105 is pivoted intermediate its ends, as indicated at 107, to the carriage 50 and is provided with a bifurcated end portion 108. As shown in Fig. 14, the arm or lever 105 and lever end-portion 104, in fact, are separate arm members which are secured to a shaft 107, the latter being rotatably mounted on the carriage 50. This construction, of course, is desirable in that it facilitates construction but it will be noted that the effect of this separate arm construction is that of a lever pivoted intermediate its ends as above referred to.

By reference to Figs. 1, 2, 7, 13, and 14, it will be seen that each of the grippers $G^1$, $G^2$, and $G^3$ is provided with the above-described actuating lever and arm mechanism. The grippers are all actuated in unison so that the jaws are simultaneously closed around a spring and simultaneously opened. For this purpose, the bifurcated ends 108 of the lever arms 105 are connected by means of a bar or link 109 which fits between the bifurcations of the respective arms and is pivoted thereto. It will be seen that by moving the bar or link 109 to the right from the position shown in Fig. 7, each of the rock levers 97 will be caused to rock in a clockwise direction about its intermediate pivotal connection with the link 106, thereby depressing the actuating members 83. By reference to Fig. 13, it will be seen that downward movement of the actuating member 83 is effective to open the jaws 79—79.

The link or bar 109 may be moved to the right by means of cam mechanism, best illustrated in Fig. 7. This cam mechanism includes a rotating cam 110 carried by the main shaft 58 and a cam-actuating rock-lever 111 which is pivoted intermediate its ends on the pivot shaft 60. The cam-engaging end of the rock-lever is provided with an anti-friction roller 112 (Fig. 2) and the opposite end of the rock lever 111 is connected by means of a chain 113 to the right-hand end of the bar 109. The said chain extends upwardly and over a pulley or roller 114 which is rotatably mounted on a shaft 115, the latter being supported by the bracket 53.

The cam 110 is designed and synchronized with the other cams of the machine so that the gripper jaws are opened when the carriage is in its extreme left-hand position and after the springs, carried by the grippers, have been delivered to the knotters or sizing device. When the carriage is in its right-hand position, the cam and arm mechanism 110—111 operates to close the grippers so as to take hold of the springs preparatory to advancing the springs through the machine. The cam 110 is further designed to permit the chain 113 to travel in unison with the carriage to the right or to the left without effecting movement of the jaw-actuating mechanism until the carriage reaches its respective spring-receiving and spring-delivering positions.

*The spring knotters C and D*

Except for the centering head embodying this invention, to be explained more fully hereinafter, the spring knotters C and D are of substantially identical construction and are also substantially the same as the spring-knotting mechanism fully illustrated and described in the aforesaid Patent No. 1,681,728. Inasmuch as no basic claim is made herein to the knotter construction per se a detailed description of the same is deemed unnecessary. However, in order to facilitate the understanding of the present mechanism as a whole, a general description of the knotting mechanism follows omitting details insofar as possible without impairing clearness of the general description.

Each knotter C and D includes a head 120 which is slidably mounted on a bar 121 and on the bed plate 122 or on a bracket or like part secured to the bed plate. For so mounting the head on the bar 121, the head is provided with an offset bracket part 123 (see Figs. 1, 19, and 21) which is slidably supported on the bar 121 and tongue member 124 which engages a groove in the said bed plate part as clearly shown in Fig. 19.

For a purpose presently to be set forth, the rod or bar 121 is mounted for oscillation about its own axis and provision is made to permit such oscillation within the bracket part 123 while permitting sliding of the said bracket part lengthwise of the rod 121. A spring-positioning and -gripping device, forming part of each of the knotting devices, includes an arm 125 which is slidably mounted longitudinally on the square rod 121 and connected to the bracket part 123 of the knotter head so as to slide in unison therewith. While the arm 125 is slidable along the bar 121, it is also arranged to be rocked with the said bar.

At its outer end, the arm 125 is provided with a bolt 126 having a bifurcated and elongated head part 127 which is designed to receive a part of a spring adjacent the end of the latter, substantially in the manner indicated in Figs. 19, 21, and 23. Adjacent the lower edge of the forked head 127, the arm 125 is provided with a lever 128, the latter being pivoted as indicated at 129 to the arm and being adapted to be swung towards or away from the adjacent under face of the forked head 127. This lever 128 is for the purpose of clamping a portion of the spring closely adjacent the end of the latter, against the bottom face of the forked member 127 to hold the spring so that the latter will move with the arm 125 when it is rocked as an incident to oscillation of the bar 121.

The lever 128 is forced upwardly towards the forked member 127 by means of a yieldingly-supported, cam-actuated plunger which includes a push rod 130, a headed plunger member 131, and a spring 132. The plunger member 131 is slidably mounted in the push rod 130, as clearly shown in Figs. 19 and 23. The spring 132 normally tends to force the plunger member 131 to move outwardly of the push rod 130, the outward limit of such movement being adjustable by means of a nut and lock nut, indicated as a whole at 133. The push rod member 130 is provided with oppositely-disposed longitudinally-extending slots which receive the ends of a cross pin 134 which extends through the shank part of the plunger member 131. The nut and lock nut 133 limits outward movement of the plunger by engaging the ends of the cross pin 134.

The push rod member 130 (for the knotter C)

is pivotally mounted at its lower end, as indicated at 135, on a rock arm 136 which is pivotally connected, as indicated at 137, to the bed plate or other stationary part 122 of the machine. A tension spring 138 stretched between the push rod 130 and a suitably spaced point, for instance the hub of the lever 136, serves to yieldingly maintain the push rod 130 in upright position, with the enlarged head portion 139 of the plunger member 131 in frictional engagement with the face of the plate portion 140 of the knotting mechanism.

The rock arm 136 is actuated by means of a rotary cam 141 which is carried by the main shaft 58. The cam 141 is so designed that it causes the push rod 130 and plunger 131 to move upwardly just before the arm 125 is rocked downwardly from the position shown in Fig. 19 to the position shown in Fig. 21. During such downward movement of the arm 125, the cam 141 permits the arm 136 to swing downwardly to retract the push rod 130 and plunger 131 as necessitated by the downward movement of the arm 125 and engagement of the lever 128 with the top of the plunger head 139. During such downward movement, the spring 132 is effective to force the plunger upwardly with sufficient power to maintain the lever 128 in clamping engagement against the spring in the event that the cam 141 permits the rock arm 136 and push rod 130 to move downwardly with greater rapidity than the arm 125 swings downwardly.

The downward swinging movement of the arm 125 carries the coil spring (which has been formed and is in the process of being knotted by this machine) downwardly into the bite of a knotting pinion 142, incidently bending the end portion 143 of the spring into substantially the position shown in Fig. 21. The end portion 143 of the spring engages a portion of the face plate 140 and is accordingly bent upwardly around the lower part of the forked member 127 as clearly shown. The knotting pinion 142 thereafter is rotated by means of a gear 144 which is carried by a shaft 145, the latter being rotatably mounted on the bed plate 122 by means of a suitable bearing cap 146.

The plunger mechanism 130—131 of the knotter D is actuated, simultaneously with the plunger mechanism of the knotter C, by means of a bell crank mechanism, shown best in Fig. 19. The said bell crank mechanism includes an arm $136^a$, to the outer end of which the plunger 130 is pivoted as shown at $135^a$, and an arm $136^b$, which is connected by a link $136^c$ to the rock arm 136 of the knotter C.

By inspection of Figs. 19 and 21, it will be seen that both knotting devices C and D are simultaneously actuated to perform the initial spring-end bending operation and that the knotting pinions 142 are also simultaneously rotated since the driving gears for the knotting pinions are both carried by the shaft 145.

The shaft 145 may be rotated in properly synchronized relation to the movement of the other parts by any suitable means which, in this instance, consists of a roll tooth pinion 147 (see Figs. 4 and 21) which is adapted to be actuated by means of a multi-tooth worm wheel 148, the latter being mounted on the main shaft 58 for rotation therewith. For each knotting operation, the knotting pinion 142 makes substantially two complete revolutions whereby the bent spring-end 143 is wound or wrapped around an adjacent part of the spring, as shown in Fig. 24.

It will be apparent that before the initial spring-end bending operation may take place, the spring must be arranged so that the end of the spring coil is located in predetermined relation to the gripping parts 127 and 128 thereby to insure the proper length of spring-end 143 to be wrapped around the spring, as above described. Such positioning of the spring is effected by a rotatable positioning finger 149 secured to the head end 150 of a shaft 151 which is mounted in a boss provided on the knotter head 120 (see Figs. 19, 21, 22 and 25). The finger 149 is normally in the position indicated in broken lines in Fig. 25 and is rotated to the position shown in full lines in the said figure. When the springs are presented to the knotters, it is found that the end thereof is almost invariably located somewhere between the desired predetermined position and the position of the forward edge of the finger 149 when in initial position as shown in broken lines in Fig. 25. When the finger 149 is rotated, it will be seen that it will be operative to engage the end of the spring and to thereby rotate the spring sufficiently to bring the end thereof to the said predetermined position.

As has been disclosed in the above-mentioned prior patent, No. 1,851,540, means are provided for actuating both knotting mechanisms simultaneously whereby one spring has its first end knotted while another spring is having its second end knotted at the same time. When the spring-conveying mechanism (hereinbefore described) is in its extreme left-hand or delivery position, the knotting devices C and D are moved towards the springs so as to engage the adjacent ends thereof and the spring-positioning devices or -centering heads 152 and 152—*a* are simultaneously moved towards the respective springs to engage the same, the springs being thereby compressed slightly between said centering heads 152 and 152—*a* and the respective knotter head-members 120.

Each of the centering devices 152 and 152—*a* is carried by a saddle 153 which is slidably mounted on a square bar or shaft 121 (see Fig. 4). Each saddle 153 is connected by means of a link rod 154 to one end of an arm 155 which is mounted on a shaft 156 carried by suitable brackets secured to the frame of the machine. The connecting links 154 are connected at their opposite ends to the respective parts by means of ball and socket joints such as indicated in Figs. 4 and 11, or in any other suitable manner. The opposite end of the arm or lever 155 is connected by means of an adjustable link 157 to the knotter head 120.

It will be seen that when the lever 155 is rocked with the shaft 156, the spring centering heads 152 and 152—*a* and the respective knotter heads 120 will be simultaneously moved in opposite directions towards or away from each other.

Figure 5:
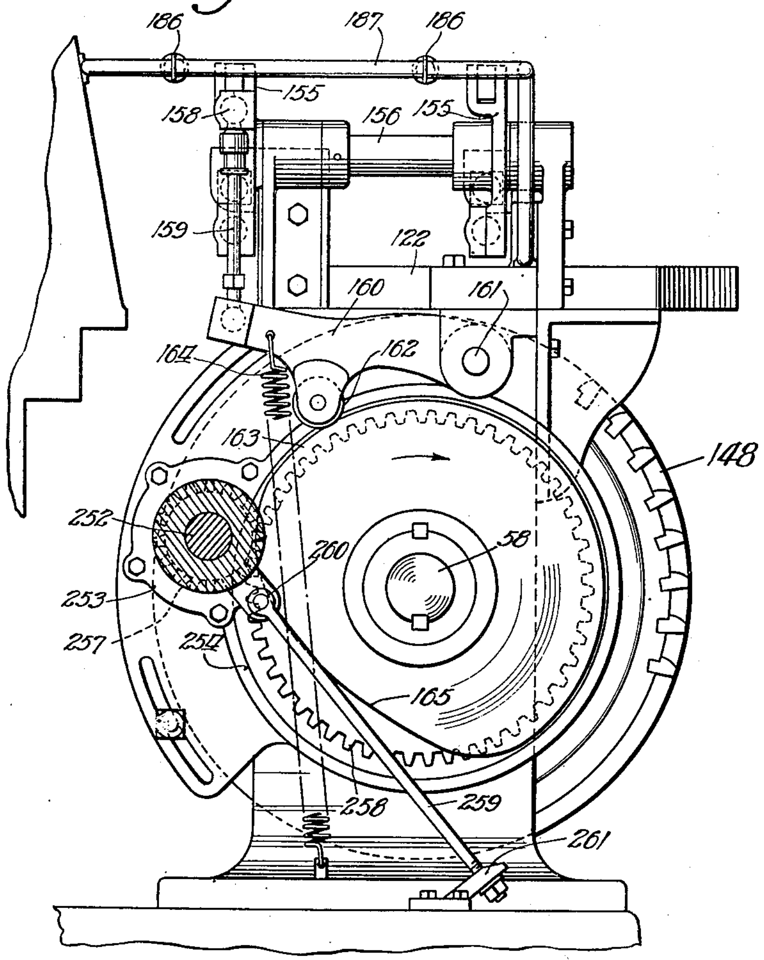
Fig. 5 is a side elevation of a portion of the machine as viewed from the plane of the line 5—5 of Fig. 4.

In order to effect the simultaneous movement of the knotter heads and centering heads, as above explained, one of the levers 155 is formed with a bell crank arm 158 to which an adjustable connecting link or rod 159 is pivotally connected at its upper end as shown in Fig. 5. The lower end of the connecting rod 159 is pivotally connected to the free end of a cam-actuated lever 160 (see Fig. 5), the latter being pivoted at one end as indicated at 161 to the bed plate 122 or other conveniently-accessible stationary part of the machine. Intermediate its ends, the lever 160 is provided with an anti-friction roller 162 which engages the periphery of a rotating cam 163, the latter being mounted on the main shaft 58 for rotation therewith. A coiled tension spring 164, stretched between the cam lever 160 and the base or other suitable fixed part of the machine, serves to yieldingly pull the cam lever downwardly so as to maintain its rollers 162 in operative engagement with the cam 163. Coiled tension springs 186, stretched between the respective knotter heads 120 and a stationary bar 187 (see Fig. 3), serve to assist the spring 164 to retract the knotter heads and spring-centering devices. From Fig. 5, it will be seen that during the rotation of the cam 163, the roller 162 traverses the relatively flattened peripheral portion 165 of the cam, whereby the outer end of the lever 160 is caused to reciprocate vertically, thereby imparting rocking movement to the arm 158, the shaft 156, and the rock arms 155.

When the springs have been centered and slightly compressed between the knotter heads 120 and cooperating centering devices 152 and 152—*a*, the positioning finger 149 for the respective knotters is rotated through an arc of approximately 180 degrees to position the end of the spring, as above described, preparatory to initial bending of the spring end.

Rotation of the positioning fingers 149 of each knotter is effected by the following described mechanism. By reference to Fig. 22, it will be seen that the stub shafts 151 which carry the respective positioning fingers 149 (see Fig. 22) are provided with collars 166, these collars being secured to the respective shafts to rotate therewith. These collars preferably are secured in place so as to permit rotary adjustment thereof relative to the respective shafts 151. This may be accomplished by means of a nut 167 which fits a suitably threaded stem portion provided on the end of the shaft 151, the nut serving to force the collar 166 endwise against a bushing 168, the latter having its other end in engagement with the head portion 150 of the shaft 151 (see Fig. 22).

A reciprocated chain mechanism is provided for effecting rotation of the respective shafts 151. As will be noted from Figs. 1, 9, and 25, this chain mechanism includes a chain 168′ which is connected at one end to a coiled tension spring 169, the latter being anchored at one end to a conveniently-located, fixed part of the machine as, for example, a part 170 of the frame of the spring coil mechanism A. The chain 168′ passes around the collar 166 of the knotting device D and then horizontally to the knotting device C where the chain is passed upwardly around the collar 166 and downwardly therefrom. At its lower end, the chain 168′ is adjustably connected to the free end of a rock arm 171 which is pivotally mounted as indicated at 172 on a suitable bracket provided for that purpose. Intermediate its ends, the rock arm or lever 171 is provided with an anti-friction roller 173 which engages the periphery of a rotating cam 174 carried by the main shaft 58. The cam 174 is shaped so as to impart the desired up and down movement to the rock arm 171 and to thereby effect reciprocation of the chain 168′. Of course, it will be observed that the cam is operative to effect movement of the chain in one direction while the spring 169 serves to effect movement of the chain in the opposite direction.

The chain 168′ may be connected conveniently to the respective collars 166 by providing one link of the chain with a stud such as indicated at 175 in Figs. 26 and 27, which stud fits in a socket provided in the respective collars for receiving such stud. An adjustable connector 176 is provided in the length of the chain 168′ intermediate the two knotting devices C and D so as to permit adjustment of the position of the finger 149 of one knotting device relative to the position of the finger of the other knotting device.

For definitely limiting the forward movement of the fingers 149, one or both of the knotting devices D and C may be provided with an adjustable stop arrangement. Such a stop arrangement, associated with a knotting device D, is shown in Figs. 1 and 27. A stop pin 177 is carried by a collar 166 of the knotting device D. The pin 177 projects laterally from the collar 166 and is adapted to engage an adjustable stop member 178 which is in the form of a bolt which threadedly engages an aperture provided in a lug 179 projecting from the rearwardly extending boss part of the knotter head 120. Slight adjustments made in the setting of this adjustable stop need not always be accompanied by adjustment in the length of the actuating chain 168′, since the same is flexible and under practical conditions sags slightly. In case the adjustable stop arrangement is reset so as to shorten the actual arc of travel of the fingers 149, the slack or sag in the chain 168′ may be correspondingly lessened, thereby permitting the full movement of the cam lever 171 under the action of the cam 174.

Upon completion of the spring-positioning operation by rotation of the fingers 149 of the respective knotters, the respective arms 125 and bars 121 are caused to rock to effect the initial end bending operation of the spring ends, previously described. Simultaneous rocking movement of the bars 121 and parts carried thereby is effected by mechanism best shown in Figs. 1, 4, and 28. This mechanism includes bent arms 180—180 which are clamped on the respective square bars 121 in any suitable manner; for instance, as shown in Fig. 28. The arms 180 are bent in the manner shown so as to extend around the respective connecting rods 157 and so as to position the path of travel of the ends of the arms directly above the respective bars 121 and also so that the movement of the ends of the arms is approximately equally divided on the opposite sides of the axes of the respective bars 121. The upper or free ends of the bent arms 180—180 are connected by means of an adjustable link 181. It will be observed that rocking movement imparted to either of the arms 180 or bars 121 will be imparted to the other by reason of the connection just described.

Rocking movement is imparted to the bar 121 of the knotting device C by duplex cam mechanism best shown in Fig. 28. This mechanism includes a pair of cams 182 and 183 which are carried by the main shaft 58 and rotated therewith. The cams 182 and 183 are respectively adapted to act on the opposite ends of a rock lever 184 which is pivotally mounted intermediate its ends, at 158, on a bracket carried by the bed plate 122 or other stationary part of the machine. The opposite ends of the rock lever 184 are provided with anti-friction rollers for engaging the respective cams and one end of the lever is connected by means of an adjustable link 186 to one of the arms 180. The cams 182 and 183 are so designed that the respective ends of the cam lever 184 are forced upwardly in properly timed relation, one cam being recessed so as to permit lowering of the corresponding end of the lever when the other cam causes upward movement of the other end of the lever. Thus, it will be seen that positive rocking movement of the resepctive bars 121 is effected.

Upon completion of the downward-rocking movement of the respective knotter bars 121—121, and parts carried thereby, the knotting pinion 142 of each knotter is actuated by the mechanism previously described. Upon completion of the knotting operation, the respective bars 121—121 are rocked in the opposite direction to move the coil spring out of the bite of the respective knotting pinions, after which the spring-conveying mechanism is again operated to advance the springs in the manner previously explained.

*The knot alining mechanism*

The mechanism thus far described serves to successively knot the two ends of the spring coils. In the formation of the spring, the free ends of the coils do not always necessarily occur in such position that the knots formed at the ends of the springs will be in axial alinement at one side of the spring. For certain purposes, it is highly desirable that the knots at the ends of each spring be at least nearly in axial alinement with one another, although not necessarily in actual alinement. Slight off-setting of the knots is not objectionable.

To effect alinement of the knots, mechanism is provided which cooperates with the knot formed at one end of the spring to turn the spring about its axis so as to position the first-formed knot in predetermined alinement with the knotting mechanism which is about to knot the other end of the spring. The last formed knot will then be formed in the desired alinement with the first formed knot.

The knot positioning mechanism (see Figs. 29 to 32) embodies the following construction of the centering head 152—*a*. Said centering head 152—*a* comprises a disk 152—*b* which is provided with a hub suitably formed to receive a ball bearing, whereby the disk is rotatably mounted on the shaft 152—*c* (Fig. 32). The disk is confined on the shaft between collars 152—*d* and 152—*e*, which are suitably secured to the shaft against movement lengthwise of the shaft. The disk has a peripheral flange (see Fig. 29) which serves to position the already-knotted end of a spring on said disk. The spring-engaging or front face of the disk is provided with a pair of forwardly-projecting positioning pins 152—*f*, which are adapted to straddle the coil part about which the first knot is formed, as shown in Figs. 30 and 31.

The collar 152—*d* is provided with a more or less radially projecting pin 152—*g* which is adapted to be engaged by a stop member 152—*h* which is secured to the back or hub of the disk 152—*b*. This stop pin and stop member serve to limit rotary movement of the disk in one direction about the axis of the shaft 152—*c*.

A cross member 152—*i* is secured to the periphery of the flanged disk 152—*b* so that end portions of the cross member project laterally upon the opposite sides of the header. The rear end portion of said cross member has connected to it one end of a coil spring 152—*j*, the other end of which is anchored in a collar 152—*k* which is secured to the shaft 152—*c*. This spring 152—*j* is positioned and normally stressed so that it will normally maintain the stop 152—*h* in engagement with the stop pin 152—*g*, the disk 152—*b* being thereby normally urged to or held at one extremity of its permitted rotary movement about the shaft 152—*c*.

Mechanism is provided for turning the disk 152—*b* about the axis of the shaft 152—*c* against the torque of the sprng 152—*j*, thereby to cause the forwardly projecting pins 152—*f* to move into engagement with the spring shoulder 152—*m* which constitutes a part of the first formed knot. As shown in Fig. 30, the pins 152—*f* are spaced far enough apart to pass over the turns of the coil which constitute the bend portions of the knot so that the outermost of the said stop members may come into engagement with the shoulder 152—*m*, as shown in Fig. 31.

Rotary movement is imparted to the disk 152—*b* by means of an arm 152—*n* which is rigidly secured to the head 139 of the plunger 131 of the knotting mechanism with which the disk 152—*b* cooperates. The arm 152—*n* is secured to the plunger head 139 through the agency of a bracket arm or ear 152—*p* which extends laterally from the plunger head toward the spring positioning-head disk 152—*b* (see Figs. 29–31). The arrangement is such that when the cooperating knotter and positioning-head have been moved toward each other to grip the spring therebetween, the arm 152—*n* will be located vertically beneath the outwardly or forwardly projecting end portion of the cross member 152—*i*. Then, when the plunger 131 moves upwardly as already explained, the arm 152—*n* will engage the overlying portion of the cross member 152—*i* so as to impart the required knot-positioning rotation to the disk 152—*b* and its positioning pins 152—*f*.

The said rotary movement of the spring positioning disk 152—*b* is effected during an intermediate portion of the upward movement of said plunger 131 and before the spring clamping lever 128 clamps the spring against the forked element 128 tightly enough to prevent turning of the unknotted end of the spring in the knotter head.

The upward movement of the arm 152—*n* effects counterclockwise rotation of the disk 152—*b* as viewed in Figs. 30 and 31. This produces clockwise turning of the spring when viewed toward the knotter, as in Fig. 19. Hence, it will be seen that the free end of the unknotted terminal coil of the spring will be turned clockwise and toward the starting position arm 149 of the knotter. The knotter arm 149 then operates in its normal manner as already explained, to return the free end of the terminal coil of the spring to proper position with respect to the element 127 and the knotting gear 142. Such return or counterclockwise movement of the terminal coil of the spring cannot turn the spring in its entirety backwards, since such reverse rotation of the spring is resisted by engagement of the spring shoulder 152—*m* (Fig. 31) with the pin 152—*f*, movement of the latter being prevented by the engagement of its peripheral cross member 152—*i* with the arm 152—*n*. The small amount of travel which is usually imparted by the arm 149 of the knotter to the free end of the unknotted terminal coil of the spring is usually accomplished by a slight enlargement of the adjacent terminal coil only of the spring, very little torque being introduced into the spring by the action of the arm 149. Thereafter, the knotter D is actuated to knot the second end of the spring, the knot being formed substantially in axial alinement with the knot at the other end of the spring. When the spring is later released from the mechanism, any slight torque which may have been introduced into the spring by the action of the arm 149, may cause slight off-setting of the knots as the spring assumes a torque-free or unbiased condition. The slight off-setting which may occur in this manner does not throw the knots out of alinement to an objectionable extent, it being understood that exact alinement is not required.

It will, of course, be understood that the limited rotary movement imparted to the spring positioning head 152—*a* is adequate for the specified purpose, because the springs are automatically delivered to said head with the first formed knot always in about the same relationship to the head. This follows from the described mechanical transfer of the springs from the first unit of knotting mechanism to the second unit of knotting mechanism.

*The sizing mechanism*

The sizing mechanism E consists generally of means for compressing the springs to a predetermined extent so that upon being released, the springs will expand to an approximately uniform over-all length, or at least to a length within certain predetermined limits of variants. The sizing mechanism is best shown in Figs. 1 and 18. From these figures it will be seen that the sizing mechanism includes a receiving mouth portion formed by the converging side plates 190 and 191, the plate 190 being carried by a bracket 192 which is mounted on the bed plate or any other suitable stationary part of the machine. The side plate 190 extends longitudinally of the machine, as shown in Fig. 1, so as to form a stationary spring seat 193.

The other side member 191 extends longitudinally of the machine to form a spring seat 194 opposed to the spring seat 193. This latter member is carried by a slidably-mounted plunger member 195. The plunger 195 is slidably mounted in a suitable bracket 196 which is carried by the bed plate of the machine.

Suitable means is provided for reciprocating the plunger 195 and its spring seat member 194. Such a means includes a roller 197 (see Fig. 18) which is rotatably mounted as indicated at 198 in the bracket 196. A chain 199 which extends upwardly and over the roller is indicated at 200, the plunger being provided with a groove 201 for receiving the chain. Another chain 202 extends upwardly and over the roller 197 in the direction opposite to that in which the chain 199 extends, and is connected to the plunger as indicated at 203, the plunger being provided with another groove for receiving the latter chain as indicated as 204.

The chain 202 extends downwardly from the roller 197 and is connected at its lower end to the outer end of an arm 205 (see Fig. 2) of a bell crank which is pivotally mounted at 206 in a bracket 207 provided for that purpose. The other arm of the bell crank just referred to is indicated at 208 and is provided with an anti-friction roller 209 which engages the periphery of a rotating cam 210, the latter being mounted on the main shaft 58 for rotation therewith.

The chain 199 extends downwardly from the pulley 197 and is connected at its lower end to the outer end of an arm 211 of a bell crank which is pivoted, as indicated at 212, in the bracket 207 coaxially with the bell crank lever pivoted at 206. The other arm of the bell crank just mentioned is indicated at 213 and is provided with anti-friction roller 214 which engages the periphery of a cam 215 mounted on the shaft 58 for rotation therewith.

The cams 210 and 215 are so shaped that reciprocating motion is imparted to the chains 199 and 202 and the plunger 195. When the cam 215 effects downward movement of the outer end of the arm 211, the plunger 195 and spring seat 194 are moved inwardly to compress a spring against the stationary spring seat 193. During such downward movement of the outer end of the arm 211, the cam 210 permits the arm 205 to move upwardly, the arm being pulled upwardly through the agency of the chain 202. Upon completion of the inward or compressing stroke of the plunger 195, the cam 210 effects downward movement of the outer end of the arm 205 and thereby retracts the plunger 195.

The spring seats 193 and 194 are provided with shoulders 216 and 217 respectively (see Fig. 18) for preventing upward escape of the springs, and mechanism now to be described serves to pull the springs downwardly from the sizing mechanism and to feed the same into the nesting or receiving device F.

*The spring nesting-receiving mechanism*

After the springs have been set or sized, they are fed into a receiving trough wherein they are nested so as to occupy a minimum of space. The mechanism for feeding the springs into the receiving trough and nesting them is best shown in Figs. 1, 2, 6, 16, 17 and 18. The trough is indicated at 220 and may be formed of sheet metal bent to substantially U-shape of a width corresponding to the length of the springs. The trough 220 is connected to the sizing mechanism by means of a pair of elbow conduit portions 221 and 222, the latter being formed of angle iron as clearly shown in Fig. 18. The elbow conduit members are carried by fixed side members 223 and 224 respectively and in conjunction therewith form narrow troughs which receive the respective end coils of the springs as will be readily understood from an inspection of Fig. 18.

When the spring has received its set, its friction hold against the opposite walls 193 and 194 of the setting mechanism is comparatively light, so that the weight of the spring tends to cause it to move downwardly into the elbow conduits 221 and 222. However, in order to positively feed the springs from the setting mechanism into the conduits 221 and 222, and into the trough 220, cam-actuating means is provided for engaging and moving the springs in the desired direction. This feeding device is in the form of a hook which includes an elongated bar or stem 225 and a hook or claw 226 at the upper end of the bar 225. The bar 225 is pivotally connected at its lower end to the free end of an arm 227 which is pivoted at 228 on the bracket 207. Extending from the hub of the arm 227 is another arm 229 which is provided at its outer end with an anti-friction roller 230 adapted to engage the periphery of a rotating cam 231, carried by the main shaft 58. The cam 231 is so shaped that it will be effective to rock the arms 227 and 229 and thereby forcibly lower the bar 225 and hook 226. A spring 232 stretched between the arm 227 and a conveniently-located stationary part of the machine, such as the bed plate 122, serves to raise the hook device when permitted to do so by the cam 231.

During its vertical reciprocation the bar 225 is also rocked horizontally on its pivotal connection with the arm 227. Such horizontal movement is accomplished by means of a cam 233 carried by the shaft 58 which engages an anti-friction roller 234 carried by one end of a guide bar 235. The opposite end of the guide bar 235 is provided with a fixed guide roller 236 and a yieldingly-mounted guide roller 237. As clearly shown in Fig. 16, the hook bar 225 passes between the guide rollers 236 and 237 so that horizontal reciprocation of the guide bar 235, incident to the rotation of the cam 233, is transmitted to the hook device.

The guide bar 235 is supported for such horizontal reciprocation by means of an arm 238 which is pivotally mounted as indicated at 239 in a bracket 240, the latter being carried by the base plate of the machine. Adjustable stop means 241 is provided for limiting rocking movement of the arm 238 in one direction. A spring 242, stretched between the arm 238 and a conveniently-located, relatively-stationary part of the machine, serves to normally maintain the guide-bar roller 234 in engagement with the cam 233 and to retract the guide bar and hook member from its advanced position.

The horizontal movement of the bar 225 is timed with respect to its vertical movement so that outward movement of the hook 226 is effected when the hook is in its extreme raised position. Accordingly, the hook will project over the spring located between the opposite sides of the setting mechanism. Upon lowering of the hook device, the spring is pulled downwardly into the conduit members 221 and 222, as clearly indicated in Fig. 16. In addition to the hook 226, the bar 225 is provided with an auxiliary hook 243 which is designed to engage such springs as remain in the upper portion of the conduits, as shown in Fig. 16. Thus, it will be seen that the springs are positively fed downwardly through the conduits 221 and 222.

Figure 6:
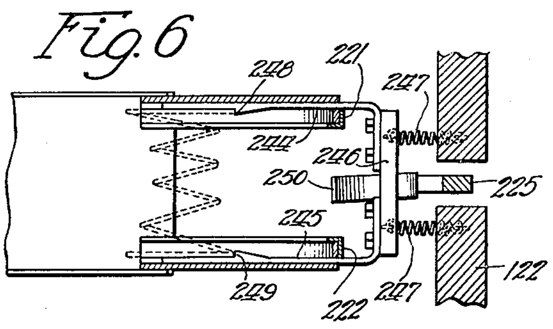
Fig. 6 is a fragmentary detail taken on the line 6—6 of Figs. 2 and 16.

The springs are positively fed from the conduits 221 and 222 into the trough 220 by means of a reciprocating feeding device which is in the form of a U-shaped member including side members 244 and 245 and a connecting part 246 (see Fig. 6). The side members 244 and 245 are slidably mounted in ways provided in the side members 223 and 224, respectively. Springs 247, stretched between the part 246 and a stationary part of the machine, serve to normally pull the feeding member rearwardly. The feeding member is moved forwardly as an incident to the forward horizontal movement of the bar 225 which engages the back of the connecting member 246 thereby forcing the said member forwardly against the pull of the spring 247.

The side members 244 and 245 of the feeding device are provided with teeth such as indicated at 248 and 249, respectively (see Fig. 6), which are designed to engage the respective end coils of a spring, as clearly shown in Fig. 6, so as to force the spring forward when the feeding device is advanced as above explained.

For assisting this feeding device to perform its function, and to facilitate nesting of the springs, the bar 225 may also be provided with a packer 250 (see Fig. 16). The packer 250 is in the form of a length of strap iron so positioned as to engage an intermediate portion of the springs in the troughs 221 and 222, when the bar 225 is moved forwardly, and thereby force the springs into the desired nested arrangement.

*Driving mechanism for the main shaft 58*

The main shaft 58 of the knotting and setting mechanism may be driven by any suitable means. Preferably this is done by a power take-off from the main power shaft 44 of the spring coiling mechanism. By reference to Figs. 3, 4, and 5, it will be seen that this power take-off is effected by means of a chain 251, preferably of the silent-chain type. This chain extends around suitable sprockets, one of which is carried by the main power shaft 44 and the other of which is carried by an auxiliary or countershaft 252. The countershaft 252 is journaled in a bearing bracket 253 which is supported by a drumlike member 254, the latter being rotatably mounted on a boss 255 formed integral with one of the supporting standards 256 which supports the bed plate of the spring-knotting and -setting mechanism.

The countershaft 252 is provided with a pinion gear 257 (see Fig. 5) which meshes with a gear 258, the latter being keyed or otherwise secured to the shaft 58 so as to effect rotation thereof. As clearly shown in Fig. 4, the gear 258 is located within the drum-like member 254 whereby the latter serves as a guard. The drum 254 and bearing bracket 253 are held against rotary displacement by means of a tie rod 259 which is connected at one end, as shown at 260, to the bearing bracket 253. The other end of the tie rod 259 is provided with an adjustable connection 261 with the base of the machine. It will be observed that the normal tendency of the driving chain 251 is to pull the shaft 252 and bracket 253 upwardly around the axis of the main shaft 58. Such tendency is obviously overcome by the tie rod 259. Slack in the chain 251 may obviously be controlled by adjusting the position of the shaft 252 by means of the adjustable connection 261 between the tie rod and base of the machine.

SUMMARY

The mechanism above described constitutes a complete and unitary device for making spiral springs, for knotting and tying both ends of the springs with the knots in virtual alinement, setting or sizing the springs, and finally packaging the same in a nested arrangement for convenience in further handling. It will be observed that as each spring is completed in the coil mechanism it is conveyed through various operating mechanisms in a path of travel substantially straight, both horizontally and vertically, and comparatively short.

By the arrangement described, the mechanism for performing the various operations is made comparatively simple and compact so that the machine occupies a minimum of space. All of the operations performed by the machine are effected automatically in their proper sequence and it will be understood, of course, that the various actuating mechanisms are so synchronized relative to each other as to carry on the successive operations in properly timed relation. While a new spring is being formed by a coiling machine, one spring is having its first end knotted by the knotter C, another spring is having its second end knotted by the knotter D after it is rotated in the second knotter so as to locate the first knot in alinement with the knot-forming means of the second knotter, and another spring is being sized or set by the mechanism E. Thus, there are four distinct operations being carried on simultaneously, each operation being on a different spring.

While the separate operations are being simultaneously performed, the spring-conveying mechanism B is being retracted to its initial or starting position in which it is illustrated in Fig 2. The four operations above referred to are simultaneously completed, whereby the grippers are caused to grip the springs in the first three operating devices, after which the springs are released and the conveying device is returned to its initial position preparatory to advancing each of the subsequently-formed springs to the succeeding stages of operation.

Variations and modifications in the details of structure and arrangement of the parts may be resorted to within the spirit and coverage of the appended claims.

I claim:

1. In a machine of the class described, the combination of a knotter for tying one end of a coil spring whereon the other end of the coil has already been knotted, means for delivering said coil spring to said knotter, opposed support means associated with said knotter for engaging the end coils of said spring, one of said support means being rotatable and having a portion holdingly engageable with said first-formed knot, means for rotating said rotatable support through a predetermined arc thereby to position said first-formed knot relative to said knotter.

2. In a mechanism for knotting one end of a coil spring the other end of which coil has been previously knotted, the combination of a supporting frame, a pair of opposed heads movable on said frame toward and away from each other for gripping said coil spring between said heads preparatory to having said one coil end twisted around the next adjacent coil of said spring, a finger rotatable on one of said heads so as to swing over the surface of said head to abut the terminus of said one coil end to locate the same in the required position for knotting by said knotting mechanism, mechanism for actuating said finger, the other of said heads being rotatable and having thereon an abutment engageable with said previously-formed knot, means for rotating said other head through a pre-determined arc thereby to position said previously-formed knot relative to said knotting mechanism.

3. In a mechanism for knotting one end of a coil spring the other end of which coil has been previously knotted, the combination of a supporting frame, a pair of heads movable axially on said frame toward and away from each other for gripping said coil spring between said heads preparatory to having said coil end twisted around the next adjacent coil of said spring, a finger rotatable on one of said heads so as to swing over the surface of said head to abut the terminus of said coil end to locate the same in the required position for knotting by said knotting mechanism, mechanism for actuating said finger, means mounting said other head for reciprocal rotation, a shoulder on said other other head for engaging the previously-formed knot on said spring, and co-acting means on said other head and said frame operated by the aforesaid finger-actuating mechanism for rotatably shifting said other head so as to move said shoulder to engage said previously-formed knot and dispose the spring so that previously-formed knot will be in approximate alignment axially of said spring with said knotting mechanism whereby in the finished spring the knots at opposite ends are approximately in alignment axially of said spring.

4. In a mechanism for knotting one end of a coil spring the other end of which coil has been previously knotted, the combination of a supporting frame, a pair of heads movable axially on said frame toward and away from each other for gripping said coil spring between said heads preparatory to having said coil end twisted around the next adjacent coil of said spring, a finger rotatable on one of said heads so as to swing over the surface of said head to abut the terminus of said coil end to locate the same in the required position for knotting, means mounting said other head for reciprocal rotation, a shoulder on said other head adapted to engage the previously-formed knot, a spring normally urging said other head toward a retracted position whereby said coil spring will be contacted by said other head with the knot formed in said spring in advance of said shoulder, a finger on said other head, and an arm on said frame positioned for engagement by said finger whereby said other head will be rotated against the action of said spring so as to move said shoulder to engage said previously-formed knot and rotate said coil spring to bring the previously-formed knot into approximate alinement axially of said spring with the knot subsequently formed with said end coil.

5. The combination with a mechanism for knotting one end of a coil spring, the other end of which has been previously knotted, of a frame, a rock shaft journaled on said frame, a pair of opposed heads slidably mounted on said rock shaft for movement toward and away from each other to retain a coil spring between them, means for rocking said rock shaft to move a coil spring held between said heads into and out of position for having the end of said coil knotted by said mechanism, clamping means mounted on said rock shaft in association with one of said heads and actuable for locking said spring against movement during the knot-tying operation, a cam-reciprocated plunger mounted on said frame for actuating said clamping means, a finger rotatable on said last-mentioned head so as to sweep over the surface thereof to abut the terminus of said coil end to locate the same in required position for knotting, the other of said heads being in the form of a reciprocatingly rotatable disk, a shoulder on said other head for engaging the previously-formed knot on said coil spring, a spring normally rotating said other head to retract said shoulder from a position to engage said previously-formed knot, a finger element secured to said other head, an arm on said plunger adapted to engage said finger element during the upward movement of said plunger so as to effect a rotary movement of said other head whereby said shoulder engages said previously-formed knot and said coil spring is rotated so that the previously-formed knot will be in approximate alignment axially of said spring with the position whereat said second knot is to be formed by said mechanism.

SILVIO BARSANTI.

REFERENCES CITED

The following references are of record in the file of this patent:

UNITED STATES PATENTS

| Number | Name | Date |
|---|---|---|
| 1,851,540 | Gail | Mar. 29, 1932 |
| 1,867,128 | Wunderlich | July 12, 1932 |
| 2,249,996 | Wunderlich | July 22, 1941 |